United States Patent [19]

Buuck et al.

[11] 3,828,465

[45] Aug. 13, 1974

[54] DIRECT-ENTRY CASH REGISTER

[76] Inventors: Frederick A. Buuck, 421 W. Maple Grove, Fort Wayne, Ind. 46807; Robert E. Fritsch, 5133 Forest Grove Dr., Fort Wayne, Ind. 46815

[22] Filed: Feb. 7, 1973

[21] Appl. No.: 330,308

[52] U.S. Cl.................. 235/6, 235/60.4, 235/60.15, 235/145 R, 235/146, 340/286
[51] Int. Cl........................ G06c 29/00, G07g 1/00
[58] Field of Search ............. 235/6, 146, 145, 60.4, 235/60.15, 91 L; 340/286

[56] References Cited
UNITED STATES PATENTS

| | | | |
|---|---|---|---|
| 3,156,412 | 11/1964 | Julius et al. | 235/146 |
| 3,441,206 | 4/1969 | Wallace | 235/6 |
| 3,565,334 | 2/1971 | Reynolds | 235/145 R |

*Primary Examiner*—Stephen J. Tomsky

[57] ABSTRACT

A direct-entry cash register for totaling the prices of a selected quantity of a predetermined plurality of items offered for sale, the combination comprising item switch means for selecting a quantity of each of one of a predetermined plurality of items, the item switch means including a plurality of line-item switches, there being one item switch for each item offered for sale and each item switch being selectively operable between a plurality of discrete positions. Each position of the switches corresponds to a different selected quantity of the associated item. Means are provided for programming into the cash register the price of each item offered for sale, the programming means including a plurality of groups of manually settable price switches, each group of switches being operable between a multiplicity of discrete positions corresponding to a multiplicity of prices. There is one group of price switches for each item offered for sale. A first indicia means is associated with each item switch for identifying the item corresponding thereto and second indicia means are operatively coupled to each of the item switches for automatically and visibly indicating the selected quantity of the item. A computing means is provided for automatically interrogating the item switch means and the programming means and totaling the prices and quantities of all selected items. A display means is operatively coupled to the computing means for displaying the total price of the items sold in a single transaction.

43 Claims, 17 Drawing Figures

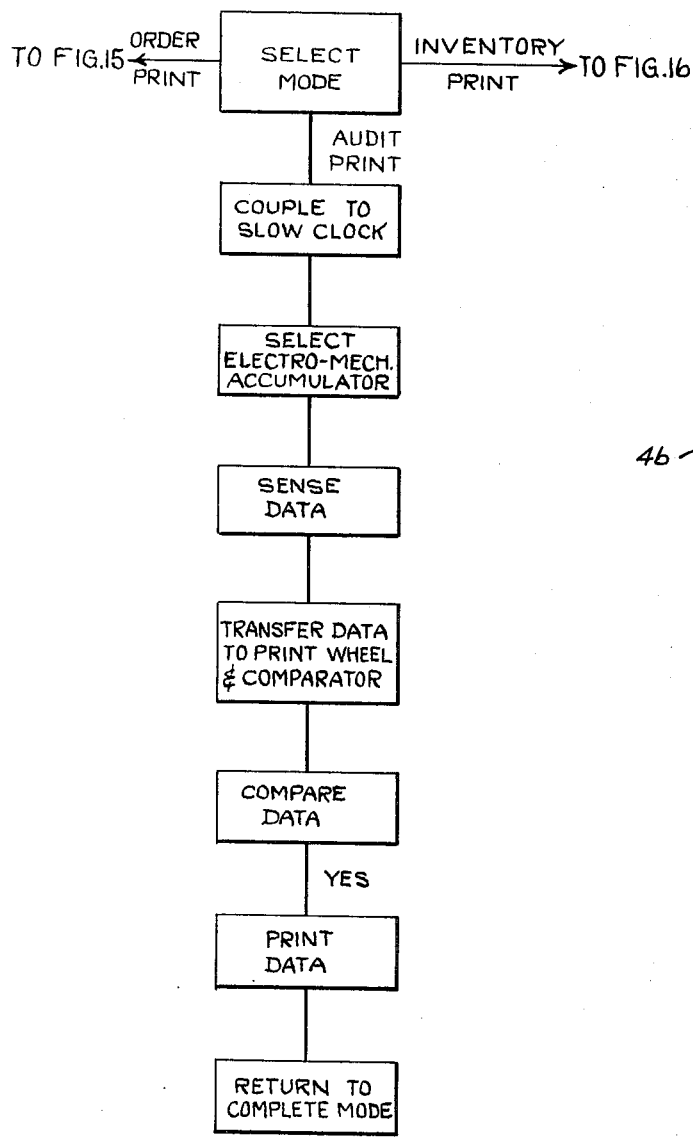
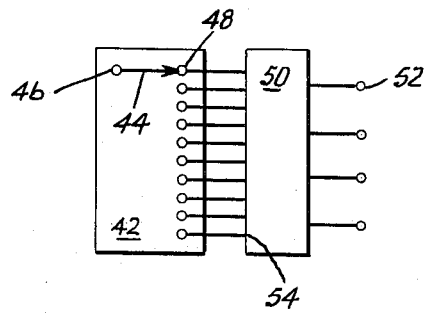

CASH DRAWER FLOW DIAGRAM

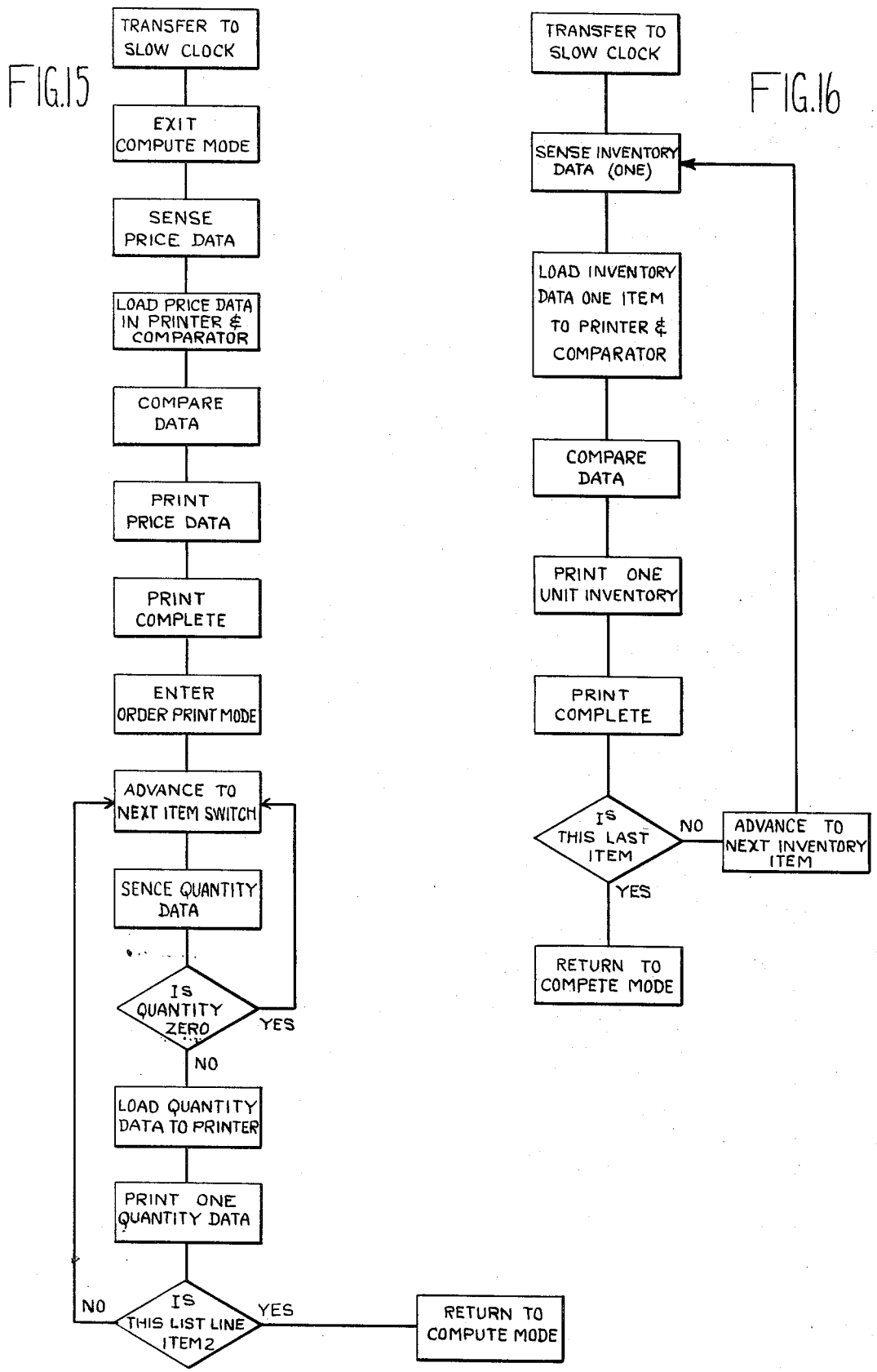

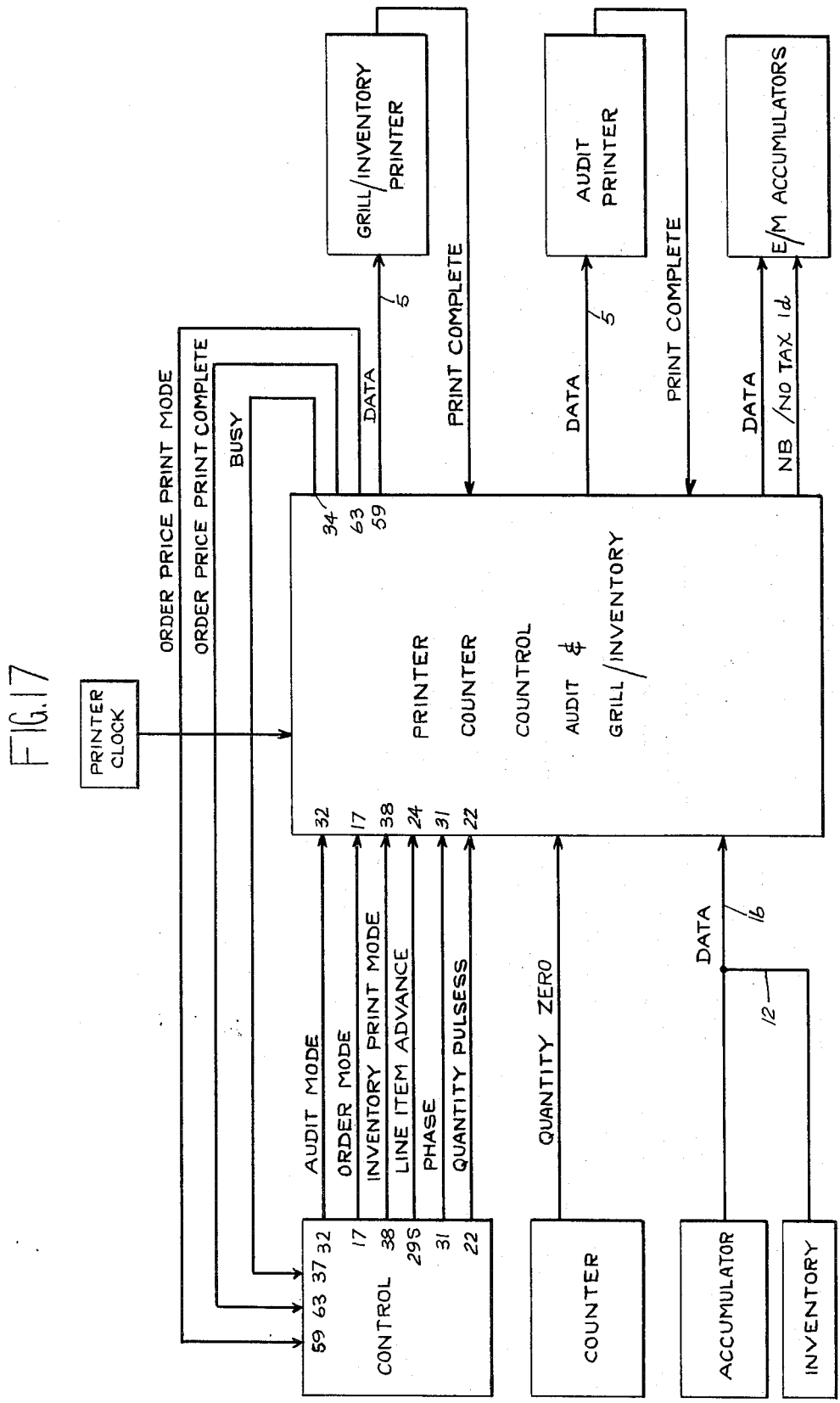

DIRECT-ENTRY CASH REGISTER

BACKGROUND OF THE INVENTION

1. Field of the Invention

The present invention relates to cash registers and in particular to a cash register for uses where a limited bill of fare is offered, such as in the "fast food" industry. Specifically, the cash register is provided with one or more keyboards or entry switch modules each having thereon an array of item entry switches. There is one such switch for each item which is offered for sale on each panel and each switch is manually settable into a selected one of a plurality of positions. Each item switch position corresponds to a different quantity of the respective item, i.e., from zero to some predetermined maximum quantity.

The cash register includes means for displaying the price of all items purchased and means for recording the price and quantity of all items sold over a predetermined period such as for example a 24 hour period.

2. Description of the Prior Art

The cash register has become an essential tool in virtually all retail sales businesses. Typically, such cash registers are provided with a keyboard or entry means which enables the entry of prices of purchased goods via the depression of a plurality of price buttons, a transaction button, and the like. Such cash registers also typically provide a printed receipt of the transaction.

In recent years, specialized cash registers which are adapted for use in specific applications such as, for example, in a cafeteria, have been provided whereby entry of the purchases into the cash register is effected by the repeated depression of a single entry button. Typically, each entry button corresponds to a different menu item and is depressed once for each item purchased and is depressed a plurality of times when more than one of any item is purchased. Again, this type of cash regiser typically provides a printed receipt of the transaction.

Such prior art cash registers are now highly developed and are well suited for general application in situations where a large quantity of different items is offered for sale in the establishment.

In recent years, a group of retail sales establishments, commonly referred to as the "fast food" stores have grown in popularity. Generally, this type of establishment comprises a restaurant facility which features a limited menu. That is, the variety of items offered for sale is limited to a specific and relatively small number of items. Examples of such establishments are those that feature hamburgers, french fries, and the like, and those that feature fish and "chips" (french fried potatoes). In the "fast food" restaurant, there are several key operating considerations. The number of items on the menu must be limited. The price of the items on the menu is generally less than the price for similar articles available at a conventional restaurant. All orders are filled at an order counter with a maximum of speed and efficiency.

Nonetheless, the cash register, which has also been an essential element in such facilities, has remained essentially the same from an operating standpoint. Correspondingly, the entry of the price of items sold is still entered by the depression of a plurality of buttons, the buttons being depressed for each item ordered and printed receipts are provided despite the fact that such receipts are only rarely required. Simultaneously, because the cash register provides no indication of the order, order blanks must be filled out by hand by the clerks taking the orders. Correspondingly, a substantial amount of the clerk's time is spent filling out order slips and recording the transaction on the cash register. This not only reduces the speed at which orders can be filled, but also requires the use of special forms for taking the orders, these forms also adding a significant cost to the operation.

A further consideration in such establishments has been the desire to price items as nearly as possible in round number figures to facilitate adding the cost of items pruchased. This objective is desirable to minimize the complexity of arithmetic addition that must be performed to thereby enable the use of less skilled help, to obviate errors in computation, and, in any event, to speed the order-taking procedure.

SUMMARY OF THE INVENTION

Broadly, the present invention is a direct-entry cash register specifically adapted for uses where a limited bill of fare is offered, such as in the "fast food" industry. Other applications of the direct-entry cash register of the present invention will be apparent to those skilled in the art, however, the invention will be described in relation to this industry.

The direct-entry cash register is provided with an entry keyboard which has thereon an entry switch for each item on the limited menu of the "fast food" establishment. For example, the keyboard may include a switch for hamburgers, a switch for double hamburgers, a switch for french fries, and the like. Each of the switches is manually settable into a selected one of a plurality of positions and each position of the switch corresponds to a different quantity of the corresponding item. A first indicia is provided to identify the item on the menu corresponding to the switch. A second indicia is operatively coupled to the switch and indicates, for each position of the switch, the quantity of the item ordered. The cash register further includes a multiplicity of price-programming switches, there being one group of price-programming switches for each item on the menu. These switches are manually settable to a multiplicity of positions with each position corresponding to a different price for the corresponding item. The cash register further includes means for automatically interrogating the item switches and the price switches and computing the total price of the items purchased. A display means is provided for indicating this last mentioned price.

By reason of the first and second indicia associated with each of the switches, the clerk is provided with a visible display of the order and the need for a handwritten or marked order slip is obviated. This in turn eliminates the cost of order blanks and reduces the time required for the clerk to take an order.

The computing means of the cash register includes means for automatically interrogating the item and price switches and totaling the cost of each purchase. Correspondingly, the need for the clerk to do any arithmetic is eliminated and the possibility of making errors is substantially reduced.

In a specific embodiment of the invention, the cash register of the present invention further includes at least one printing device operatively coupled to the computing means. The printing device can be automatically or manually energized to provide printed reports. For example, the printing device can be used to print a daily inventory report indicating the quantity of each item sold from stock, an audit report indicating the total amount of sales for a predetermined period of time such as, for example, one day.

In another specific embodiment of the invention, the cash register may be provided with a permanent accumulator such as a mechanical counter which is operatively coupled to the computing means to maintain a running total of all sales.

In yet another specific embodiment of the invention, the computing means is provided with means for automatically computing and adding to the price of purchased goods the sales or other applicable tax. Preferably, the tax computing means includes an interchangeable electronic circuit fabricated on a single "plug-in" printed circuit board and operatively coupled to the computing means. The circuit is custom configured in accordance with the tax structure in the place of use and provides a fixed program calculation. The circuit is automatically interrogated by the computing means in synchronism with the computation of the price of goods purchased, the tax circuit providing electrical signals which effect the automatic addition of sales tax to the computed price of goods.

In another specific embodiment of the invention, the cash register is provided with two separate arrays of item entry switches with their associated indicia, the two arrays being situated at different locations and operatively coupled to the same computing means. The computing means itself includes means for automatically and alternately interrogating the two different switch arrays. A separate display is provided for each switch array and the computation of prices is performed at a speed whereby both displays appear to operate continuously. By reason of this structure, a single computing circuit can be used to provide all the arithmetic computations and recording functions for two separate clerk stations. By appropriate design and programming, printers, mechanical accumulators, and the like, can be provided for each station to provide separate inventory and audit functions for both.

In yet another specific embodiment of the invention, the computing means is provided with an interlock system, i.e., a group of switches, which must be operated in a predetermined sequence to effect the entry of a transaction into the cash register, the interlock system being designed to prevent entry errors and to enable changes in the order at any time before the order has been entered into the accumulator.

Also in a specific embodiment of the invention, means are provided for automatically resetting all of the item entry switches to their zero quantity positions simultaneously.

In still another specific embodiment of the invention, separate cash drawers are provided for each of the clerk stations and means are provided for operating either of the drawers from either of the clerk stations.

It is therefore an object of the invention to provide a direct-entry cash register which enables the entry of selected quantities of ordered goods by means of a simplified switch manipulation.

It is another object of the invention to provide such a cash register which can be manually and changeably programmed to compute the price of purchased goods on the basis of different price structures without the need for entering the price information by the clerk.

It is still another object of the invention to provide such a cash register which includes means for recording sales and inventory data.

It is another object of the invention to provide such a cash register which can be programmed to automatically compute the sales tax or other taxes applicable to the purchase.

It is still another object of the invention to provide such a cash register which includes a plurality of entry panels or modules coupled to a single computing circuit whereby all of the arithmetic computations for both panels is performed by the single computing circuit.

Another object of the invention is to provide such a cash register having an interlock system which inhibits entry errors.

Still another object of the invention is to provide such a cash register which provides a visible indicia of the quantities and identification of all items of an order, thereby obviating the need for written or marked order slips.

Yet another object of the invention is to provide such a cash register which is provided with means for producing printed order slips on command to facilitate clearing the cash register when orders cannot be immediately filled while retaining a printed copy thereof.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is an electrical schematic drawing of a typical item entry switch;

FIG. 14 is a flow diagram useful in explaining the sequence of operations of the printer control module in an audit printing mode;

FIG. 15 is a flow diagram useful in explaining the sequence of operation of the printer control module in its order printing mode;

FIG. 16 is a flow diagram useful in explaining the operation of the printer control module in the inventory printing mode; and FIG. 17 is a block diagram showing some of the major signal paths of the circuit associated with the printing and recording portions of the cash register.

DESCRIPTION OF A SPECIFIC EMBODIMENT

Figure 1:
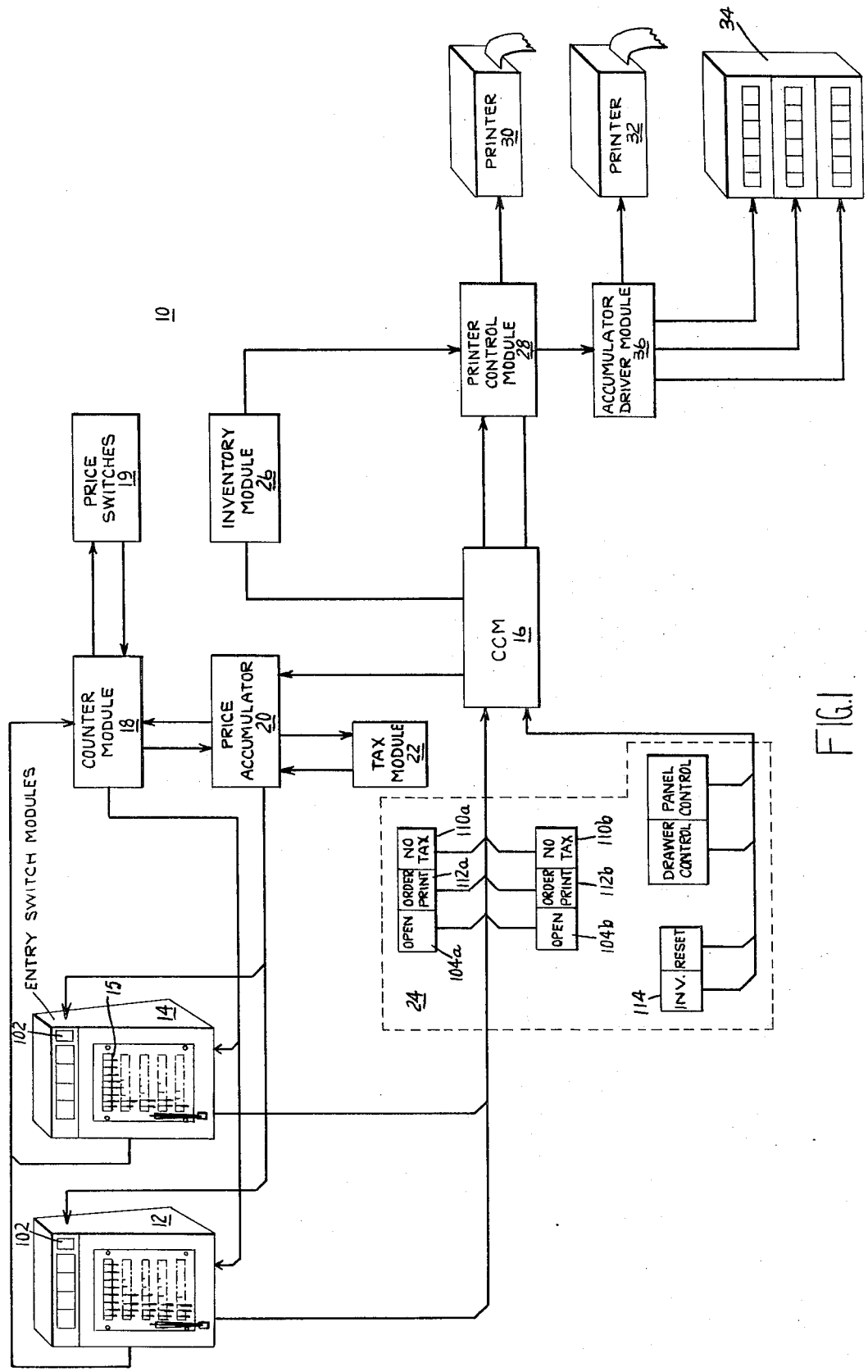
FIG. 1 is a block diagram of a direct-entry cash register in accordance with the present invention.

Referring now to the drawings, there is shown in FIG. 1 a simplified block diagram of a direct-entry cash register 10 in accordance with the present invention. The cash register comprises first and second entry switch modules 12 and 14 which may be situated at different locations for use by two clerks. Each module 12, 14 is provided with a plurality of item entry switches 15. There is one such switch on each panel for each item offered for sale. For example, there will be one switch on each panel for hamburgers, one for double hamburgers, one for french fries, etc. Each switch, as will be explained below, can be manually set into one of a discrete number of positions. Each position corresponds to a different quantity of items. Typically, the switch will have ten positions for quantities from zero through nine. If larger quantities are desired, two switches may be electrically coupled together, a more detailed description of item switches 15 and modules 12, 14 is presented below. A central control module 16, hereinafter referred to as CCM 16 is provided and will also be described in detail hereinafter. Generally, CCM 16 functions as a master sequencing control for the cash register 10.

COUNTER MODULE

Also provided is a counter module 18 which contains three separate binary counters or registers (not shown). The three registers include a line item counter capable of recording binary digits equivalent to the decimal numbers 0 through 35. Such counters are well known to those skilled in the art and may comprise, for example, two module six shift counters arranged in a six by six matrix to provide a 36 line identification scheme. The line item counter is a simple unidirectional counter which is incremented by means of sequential pulses. The line item counter provides a means for addressing or sequentially energizing each item switch 15, one at a time.

The second counter in counter module 18 is a quantity counter which is capable of registering binary counts of 0 through 39 (decimal equivalent), this counter being adapted for ganged input of binary data. Counter 18 provides a means for recording the position of each item switch 15 one at a time to thereby record the quantity of each item ordered. Counter 18 is further capable of being decremented by signals from CCM 16.

The third counter in the counter module 18 is a price counter, which is also a ganged input counter. The price counter has a capacity enabling it to accept binary digits corresponding to the decimal numbers 0 through 999 and is also capable of being decremented by CCM 16. The price counter provides a means for recording price information for use in price computations. Each of these counters is conventional and may assume any of a number of configurations well known to those skilled in the art. Typically the counters of module 18 are fabricated using "off the shelf" integrated circuits, and may, for the present application, be adapted for relatively slow operation, i.e., 150,000 Hz.

PRICE ACCUMULATOR

A price accumulator 20 is another binary register, accumulator 20 having a binary capacity corresponding to the decimal digit 9999. Accumulator 20 is a resettable counter adapted for serial input and output of binary digits. That is, the accumulator 20 will record digits and automatically add same as they are inputed one at a time.

TAX MODULE

Coupled to accumulator 20 is a tax circuit or module 22 which is, as will be explained in more detail below, a fixed program circuit which is responsive to the magnitude of the binary number in accumulator 20. Tax module 22 includes an up down tax counter (not shown) for recording binary "bits" generated in module 22. Tax module 22 is responsive to the value stored in price accumulator 20 and generates and stores a binary bit corresponding to one cent at predetermined values of the accumulator value. The counter can be decremented by signals from CCM 16 to add to the number recorded in price accumulator 20 a value corresponding to the sales tax on the purchase.

MANUAL CONTROL SWITCHES

A plurality of manual control switches enclosed in dashed box 24 are provided for controlling operations of the cash register 10 such as opening the cash drawer and selecting optional functions such as a desired printed record of the transaction. A detailed description of the switches and their functions is provided below.

INVENTORY MODULE

Also coupled to the central control module 16 is an inventory module 26. Module 26 is also coupled to the price accumulator 20 via central control module 16, inventory module 26 including therein a plurality of binary registers for recording of data such as quantities of items sold.

PRINTER CONTROL MODULE

A printer control module 28 is coupled to central control module 16 and inventory module 26 and provides an interface and control circuit for transferring data from inventory module 26 to electromechanical printers 30.

Printer control module 28 is also provided with circuitry for transferring data from accumulator 20 to a second electromechanical printer 32, or to a selected one of a plurality of electromechanical accumulators or counters contained in box 34 via an accumulator driver module 36.

ENTRY SWITCH MODULES

Figure 2:
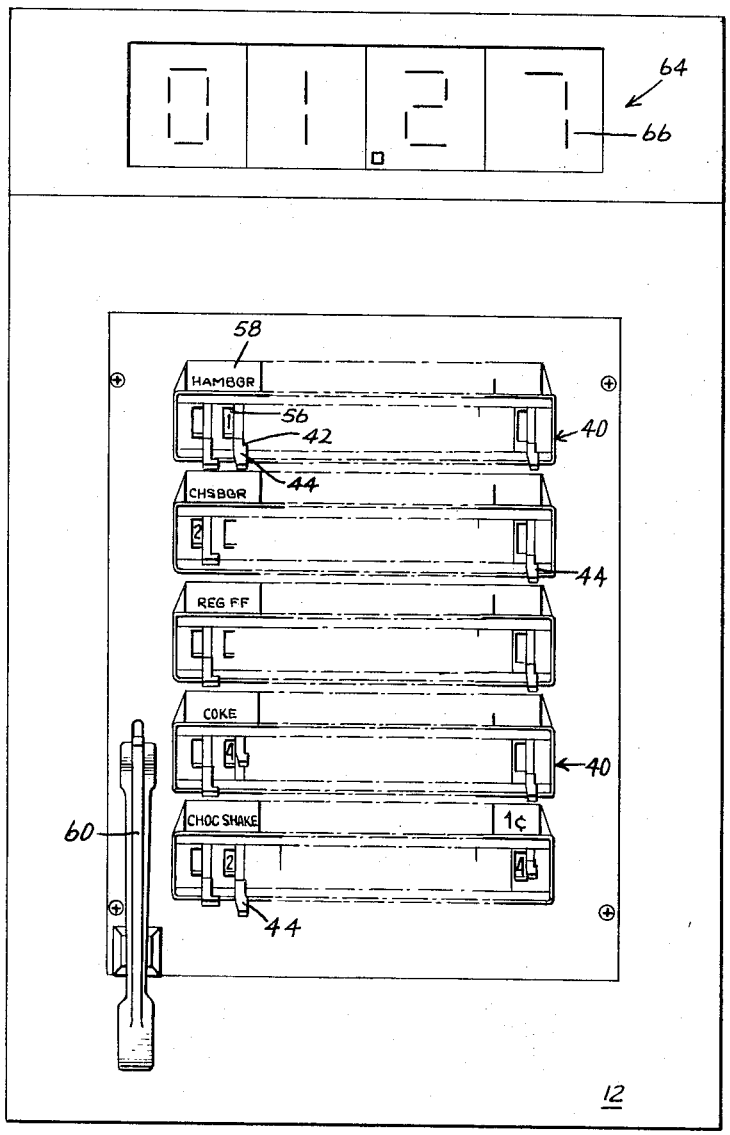
FIG. 2 is a plan view of an item switch entry panel as used in the invention.

Entry switch modules 12, 14 are essentially identical and only one will be described. Referring now to FIG. 2, there is shown an enlarged view of the face of entry switch module 12. Module 12 is provided with five rows of item entry switches as at 40, there being seven multiple position switches in each row 40 as at 42. Each of switches 42 can be manually positioned into a selected one of ten discrete positions by means of a manual operatimg lever as at 44. A typical switch 42 is shown electrically in FIG. 3. Such switches are commercially available, Digitran model 28-P-10-C switches being used in a working embodiment of the invention.

A first indicia 58 which comprises a nameplate is fixedly mounted above each switch 42. Each of indicia 58 identifies the corresponding switch 42 with a particular item offered on the menu of the "fast food" establishment. For example, the indicia 58 may identify or correlate switches 42 to items such as a hamburger, cheeseburger, french fries, and the like.

Operatively coupled to each of levers 44 is a movable second indicia 56. As lever 44 is moved to position switch 42 in each of its discrete positions, the indicia 56 will automatically indicate the corresponding, assigned decimal value associated with the position. Each switch 42 includes a common wiper 44 having an input terminal 46 and a plurality of output terminals 48, one output terminal 48 for each position of switch 42. A code to code converter 50 is electrically connected to output terminals 48. Converter 50 is adapted to generate a four bit binary code at its output terminals 52 when a signal is applied to its input terminal 54. Such converters are conventional and are well known to those skilled in the art. Each of output terminals 48 corresponds to a different one of the decimal digits from 0 through 9 and the binary coded number appearing at output terminals 52 of converter 50 will correspond to the binary equivalent of the decimal number indicated on the face of the switch for each position thereof.

In some instances, it may be desirable to have two of switches 42 electrically coupled together whereby the two switches can be individually positioned to provide decimal numbers from 0 through 99. In this event, the code to code converter 50 will also have a capacity to generate binary numbers equivalent to the decimal number 99 or, if an 8421 binary coded decimal is used, two converters of capacity 0 through 9 may be used, one for each switch of the pair.

Also provided on each switch entry module 12, is a manual reset lever 60. Manual reset lever 60 is mechanically coupled to all of the switches 42 of module 12 such that operation of lever 60 will automatically move all of switches 42 into their 0 positions, i.e., the position thereof corresponding to a value of 0.

Mounted above switches 42 is an electroluminescent display 64. Display 64 may comprise a plurality of electroluminescent, segmented or "monogram" display elements 66 such as the widely used "nixie" tube. Each of the display elements 66 is provided with a binary coded decimal to segment code converter, such converters being well known in the art and frequently being provided as an integral part of the display device. In a working embodiment of the invention, the display elements 66 are RCA Numetrons DR 2000 tubes using RCA CD 2503 converters and drivers.

PRICE SWITCHES

The price switches 19 are electrically similar to the quantity entry switches 42 but are provided in groups of two or three switches each. The individual switches of each group may be positioned into any one of a plurality of positions to thereby provide a multiplicity of switch position combinations corresponding to the decimal numbers of 0 through 99 or 999. Each switch of the group will include a wiper similar to wiper 46 of switch 42 and a plurality of output terminals similar to output terminals 48 of switch 42. Also provided is a decimal to binary coded decimal converter for converting each switch combination to the respective binary coded decimal equivalent corresponding to the decimal numbers assigned to each of the switch positions. Again, such switches and converters are well known to those skilled in the art of digital circuits.

PRICE ACCUMULATOR

Price accumulator 20 is a four stage binary register counter having a capacity enabling it to hold binary numbers equivalent to the decimal value 9,999. Price accumulator 20 is adapted for serial operation whereby it can be incremented to count up. It should be noted that all computations within the cash register 10 are in dollars and cents. Because all computations are in dollars and cents, the computations are fixed decimal and the need for computing and positioning a decimal point within the system is obviated and the display and all printed data is in terms of dollars and cents to two decimal places.

Accumulator 20 further includes means for resetting the accumulator to zero. Again, such an accumulator is well within the knowledge of those skilled in this art and may be easily fabricated using commercially available integrated circuits and further description thereof is not necessary.

TAX MODULE

Figure 4:
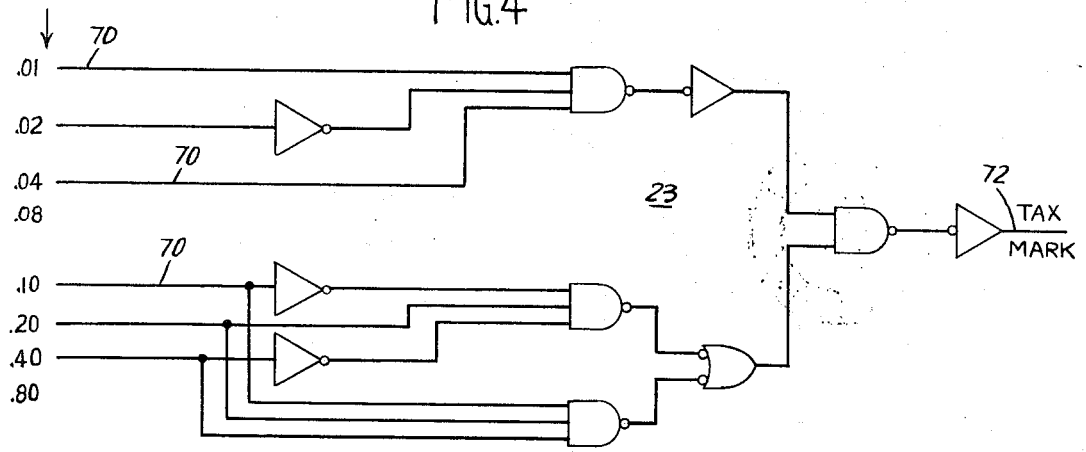
FIG. 4 is a logic diagram of a typical tax circuit for use in the invention, the logic diagram being drawn in the format of MIL SPEC 806.
Figure 5:
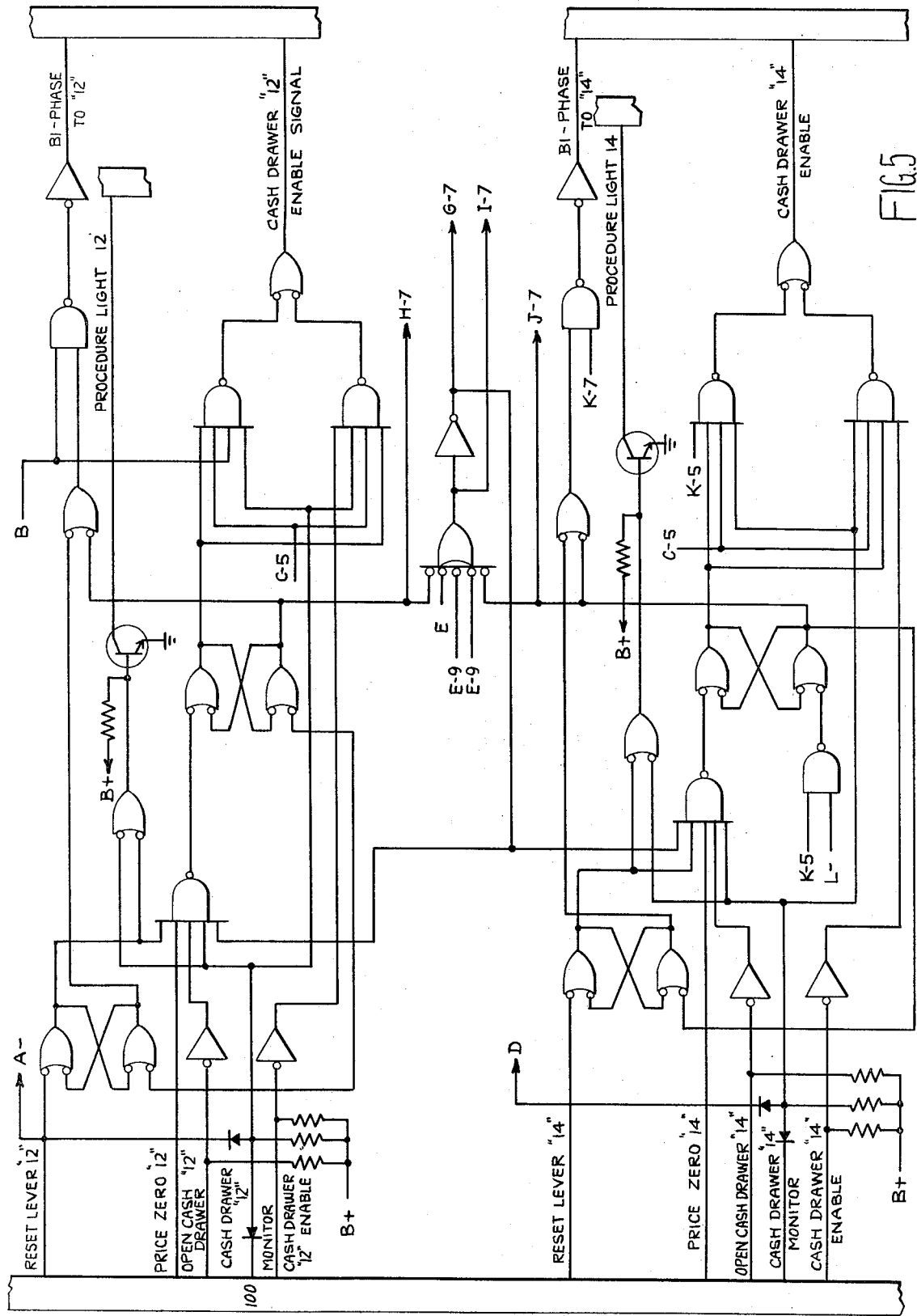
FIGS. 5 through 9 are logic diagrams of the central control module of the cash register of the present invention in the format of MIL SPEC 806.
Figure 6:
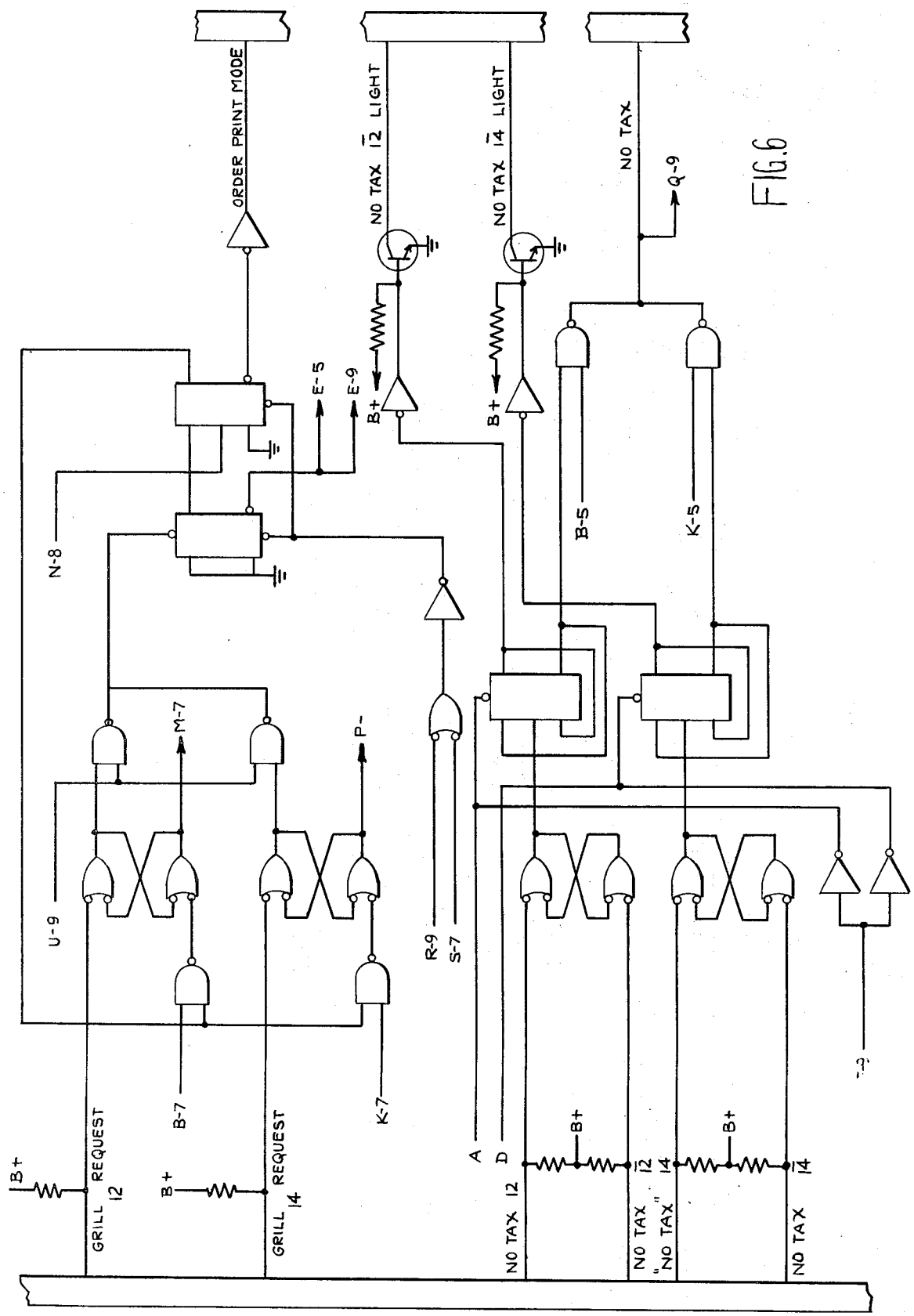
Figure 7:
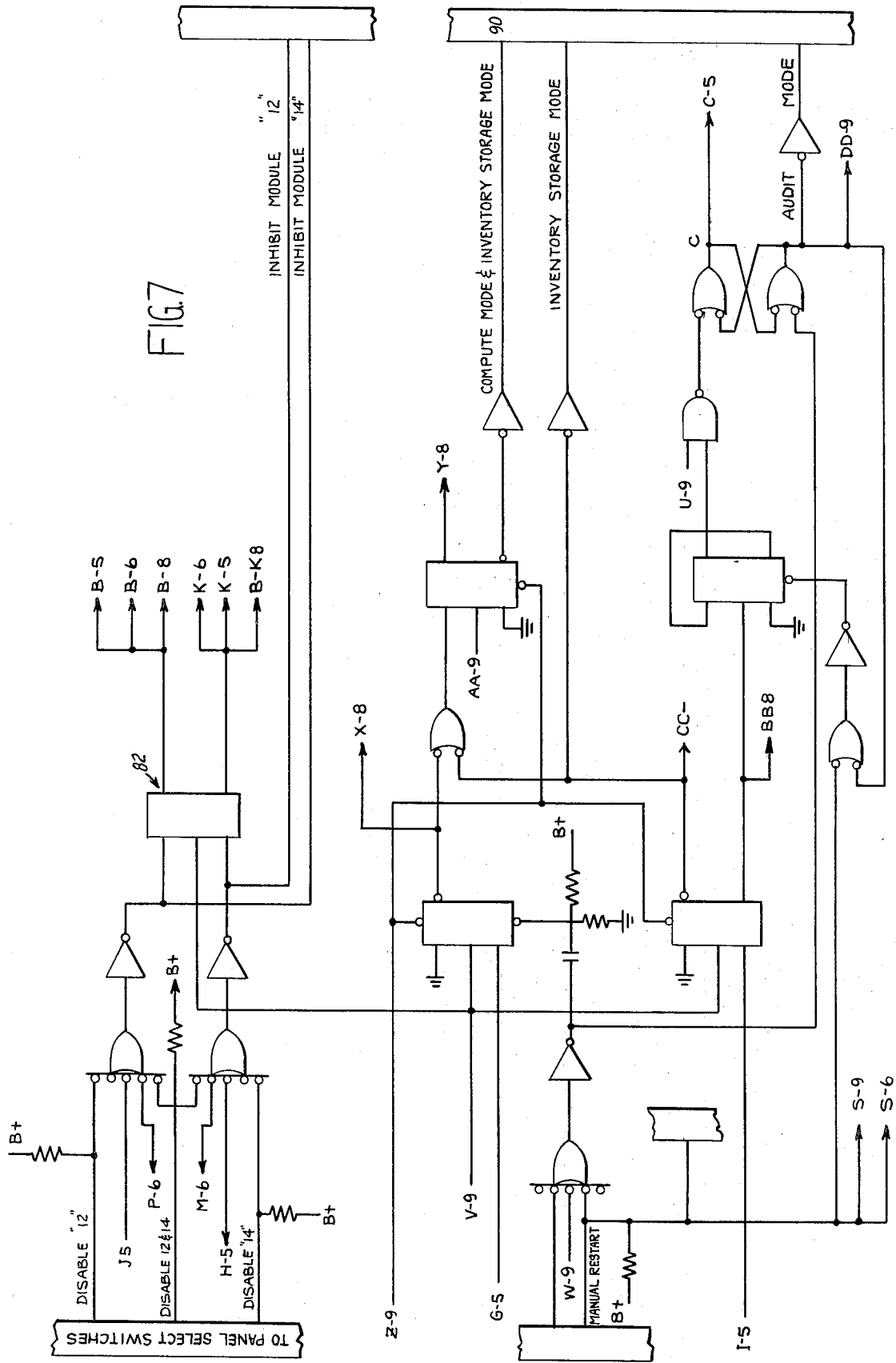

An example of a tax circuit 23 portion of tax module 22 is shown in FIG. 4. Circuit 23 is essentially a fixed program circuit having a plurality of input terminals as at 70 which are coupled to the accumulator 20. The input terminals 70 are labeled "one cent, two cents, four cents, and eight cents" and "ten cents, twenty cents, forty cents, and eighty cents," respectively, in two groups. Each group of terminals is connected to accumulator 20 to sense the least and second least significant digits thereof (cents digits). In operation, a tax mark or pulse will be produced at output terminal 72 each time the data in the accumulator is equal to 25 cents or 75 cents in the illustrated example. The "tax mark terminal" 72 is in turn applied to tax counter (not shown) to add thereto one cent.

The price accumulator 20 uses an 8421 binary coded decimal system and has four four-bit registers. The output from the least significant digit register will provide one bits in its "four" and "one" bit positions when the accumulator value is equal to 5 cents. The secondly significant digit have ave a one bit in its "two" bit position when the value in the second least significant digit position is 20 cents. Correspondingly, one pulses will appear at the .01, .04, and .20 inputs of the tax module 22. These inputs pass through the logic of the tax module 22 to produce a pulse at output terminal 72 which pulse is applied to the tax counter (not shown) to increase the value therein by one bit. When the value in the tax accumulator increases by one bit, the pulse ceases to be generated at terminal 72. When the value in tax accumulator passes through values including 25 and 75 cents, additional pulses will be generated at terminal 72 as above described. The illustrated tax circuit corresponds to the tax table of the State of Indiana. Preferably, the tax circuit or module 22 is fabricated on a single printed circuit board which is removably connected to the balance of the calculator circuit 10. It will be apparent that using the same logic format, a circuit can be fabricated to produce a tax mark in accordance with the tax table of any desired state. For example, the tax board could be fabricated to add a penny at 25 cents, 50 cents, 75 cents, and a dollar.

PRINTERS AND ELECTROMECHANICAL ACCUMULATORS

Both the printers 30, 32 and accumulators 34 are conventional electromechanical devices. Printers 30, 32 are adapted to receive sequential pulses and print alpha-numeric characters on a paper tape. An example of such a printer is the Practical Automation Model MMP62033 Accumulators 34 may be conventional rotary counters, solenoid driven, which respond to sequential pulses to advance the counts therein by one digit for each pulse. An example of such electromechanical accumulator is a Practical Automation Model CM10R.

ACCUMULATOR DRIVER MODULE

Accumulator driver module 36 is essentially a gated power drive circuit which is slaved to the CCM 16 and printer control module 28 and provides the required signals to drive printer 32 and accumulators 34 upon command from the CCM 16 and printer control module 28 in conventional manner.

PRINTER CONTROL MODULE 28

Printer control module 28 is a second control circuit or sequencer and is coupled between inventory module 26 and printers 30, 32 and accumulators 34. Printer control module 28 is essentially an extension of CCM 16 and responds thereto to transfer data from inventory module 26 or directly from price accumulator 20 to the respective printers 30, 32 and accumulators 34. A detailed description of the printer control module 28 is presented below.

OPERATION

In the following description of the operation of the direct-entry cash register 10 no effort will be made to trace the exact path of all binary signals passing through the input, computing, storage, and output circuits. Rather, the operation will be described in terms of essential input and output signals and the sequence thereof. The actual logic schematics of the CCM 16 and printer control module 28, hereinafter referred to as PCM 28, are depicted in FIGS. 5 through 9 and 10 through 12, respectively. As stated, the logic schematics are presented in the format as set forth in MIL SPEC 806. The logic diagrams are self explanatory to those skilled in the art and are not further described herein in detail. Interconnections between the diagrams of FIGS. 5 through 9 and 10 through 12 are indicated by similar letters at connecting points followed by a number indicating the Fig. number where the mating connection appears. For example A-9 indicates a connection to point A of FIG. 9.

Figure 9:
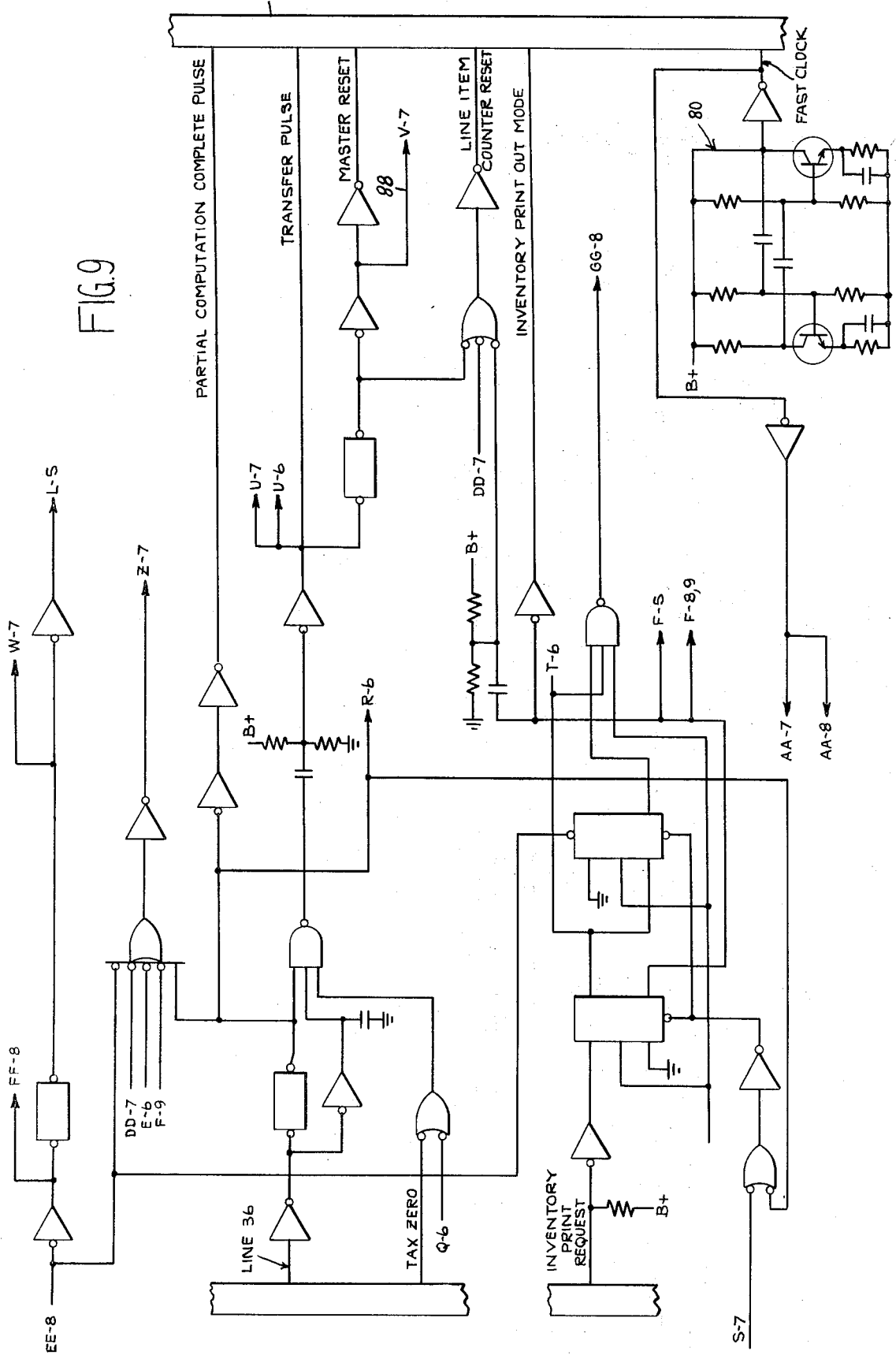

Included within control module 16 is a fast clock shown generally at 80 in FIG. 9. This clock generates the required sequencing pulses for operation of the cash register 10 at a frequency of 150 K Hz. These pulses are utilized by the cash register 10 for performing all arithmetic computations.

A slow clock (not shown) generates pulses at a slower repetition rate of 30 Hz. This clock is similar to fast clock 80 and may assume any conventional configuration. The slower clock pulses are utilized to sequence the cash register 10 when it is working in conjunction with either the printers 30, 32 or mechanical accumulators 34, the slower clock rate being required to allow for the slower operation of the electromechanical devices.

Also included within CCM 16 is a bi-phase switch, essentially a flip-flop. This switch is indicated generally at 82 in FIG. 7. The purpose of this switch is to couple either switch entry module 12 or switch entry module 14 to the CCM 16 and other portions of the cash register 10. The bi-phase switch 82 operates at the completion of each computation, i.e., the computation of the total price of all items entered on one or the other of switch entry modules 12 or 14. Correspondingly, cash register 10 will first calculate the price with tax of all items entered on switch entry module 12 and then, alternately, will compute the price of all items entered on switch entry panel 14. The computations are performed at a speed whereby both switch entry modules 12 and 14 will appear to be operating continuously.

Since the operation of the direct-entry cash register 10 is essentially identical irrespective of whether it is operatively coupled to switch entry module 12 or 14, the computations are identical and therefore the computation will be described with respect to entry module 12 only, this description being sufficient for both.

Figure 13:
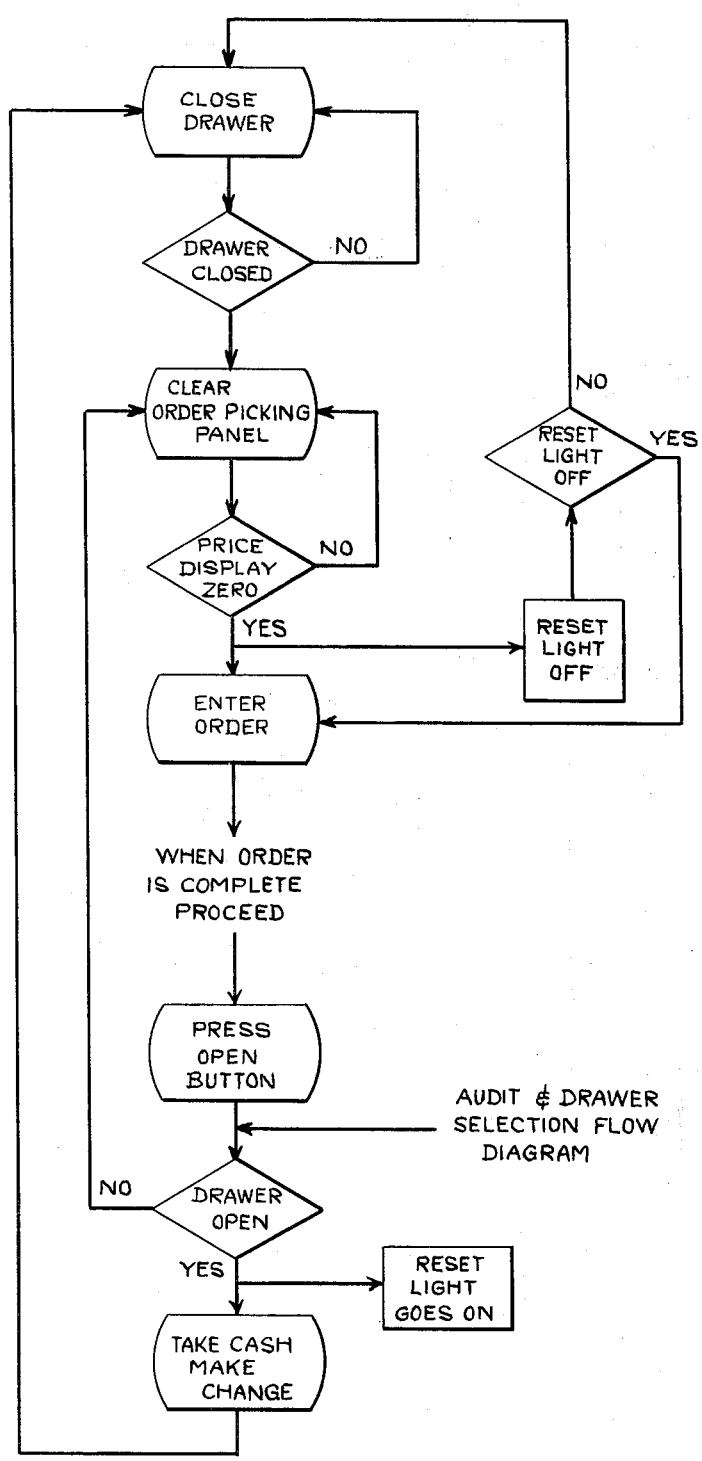
FIG. 13 is a flow diagram useful in explaining the operational sequence of the cash drawer and related functions.

Initially, it will be assumed that the cash drawer (not shown) associated with entry panel 12 is open. The initial sequence of operation of the cash register 10 is illustrated in the flow diagram of FIG. 13. A switch (not shown) is operatively coupled to the cash drawer, the switch being closed when the cash drawer is closed and open when the cash drawer is open, and provides an enabling and disabling signal, respectively, which is applied to terminal 100, FIG. 5. Next, all switches 42 on entry switch module 12 are reset to zero by manipulation of reset lever 60. Upon successful completion of this operation, the display elements 66 of display panel 64 should indicate zero, or in the alternative may be blanked. When the drawer has been closed and the panel cleared a procedure light 102 is extinguished. The cash register has now been "initialized" and is ready for the entry of the next order.

At the completion of the computation cycle, a manual button denoted as "open" button 104a is depressed to open the cash drawer (not shown) associated with module 12. When the drawer has been successfully opened, light 102 is illuminated. The cash involved in the transaction is placed in the drawer and change made at which time the transaction is complete and the next step in the operation is to close the cash drawer (not shown) as above.

In the event that the drawer does not open properly upon depression of the open button, the switch entry module must be reset to zero by manipulation of reset lever 60 and the order re-entered.

To enter the order, the clerk will manually operate the respective ones of switches 42 associated with the ordered items, moving the levers 44 of the switches 42 to the positions thereof corresponding to the quantities of each item ordered. In actual operation, computation of the price of the goods is essentially continuous whereby the price appearing on display 64 will appear to change in increments corresponding to each item ordered simultaneously with entry of the order into the switches 42. However, for purposes of explanation, it will be assumed that the entire order has first been entered into module 12 via switches 42 before the computation begins.

Initially, a master reset pulse is generated at terminal 86 of CCM 16. All of the counters in counter module 18 are reset by the leading edge of this pulse. At the trailing edge of this pulse, a start pulse is generated at terminal 88 of CCM 16.

In response to the start pulse, a compute mode enable signal is generated at terminal 90 of CCM 16. Essentially, this signal enables the computing portions of the cash register circuit. On the trailing edge of the next fast clock pulse, the CCM 16 enters its compute mode at which time it is ready to begin computation. In response to the next fast clock pulse, the CCM generates a first "line item advance pulse," hereinafter referred to as a LIAP. This pulse indexes the line item counter in counter module 18 into its first position, typically containing the binary count zero. The next clock is applied via CCM 16 to the first entry switch 42 of entry switch module 12. The pulse passes through the first entry switch 42, is converted to a BCD signal corresponding to the decimal position of the first switch 42. The first item switch 42 quantity is first tested to determine if it is zero. If "yes", another LIAP would be generated to index the line item counter to the next binary value to interrogate the second entry switch 42. If the value is not zero, the quantity corresponding to the position of the first data entry switch will be loaded into the quantity counter of module 18. On occurrence of the next fast clock pulse, the CCM 16 generates an interrogating pulse to interrogate the price switches associated with the first entry switch 42. This pulse, which is applied to the input terminals of the price switch group, is converted to a binary coded decimal value equivalent of the price of the item corresponding to the first item switch. The coded value is loaded into the price counter.

In sequence, the quantity counter is decremented by one bit and the next series of clock pulses are used to decrement the value loaded into the price counter and to add an equal number of bits into the price accumulator 26. Upon completion of loading the price into the accumulator 26, the CCM 16 again interrogates the quantity counter. If the quantity is zero a LIAP is generated to advance the line item counter. If the quantity is not zero, the quantity counter is decremented by one, and the price switches corresponding to the first item switch 42 of module 12 is again interrogated and the price value is loaded into the price accumulator as above wherein they are automatically added to the previously loaded value.

In this same manner, the line item counter is advanced by one position each time that the quantity of the corresponding item entry switch is zero or the quantity set theron and which has been loaded into the quantity counter has been decremented to zero.

Simultaneously with the adding of the price data into the accumulator, the accumulator value is applied to the tax module 22. Each time the value in the accumulator correlates with a price corresponding to a point in the tax table of circuit 23, an appropriate bit is added into the tax counter contained within tax module 22.

The display 6 of module 12 is coupled to the accumulator 26 and generates a visible, decimal display of the decimal equivalent of the value in the accumulator.

When the line item counter has been advanced to its last position, i.e., the position corresponding to the last entry switch 42 of module 12, a tax enable pulse is generated and the value in the tax counter is decrementd to zero and an equal number of bits are added to accumulator 26 to thereby add to the value therein the total sales tax due on the transaction.

In actual operation, computation is conducted continuously. The CCM first interrogates and calculates the price of items ordered via entry switch module 12 and then in response to the bi-phase control 82, interrogates and calculates the price of all goods entered on entry switch module 14. The computations are performed at a speed whereby no visible interruptions of the computations appears on either of the modules 12 or 14. Also, because of the speed of the computations, as each item entry switch is positioned to the selected quantity of goods, a complete computation will be performed whereby the value appearing in the display 64 will in fact increment and provide a visible indication of the price of goods ordered at each stage of the order taking process. This enables the customer to see the cost of items he has ordered thereby enabling him to determine whether he has or has not exceeded the price he wishes to spend on the purchase before the order is consummated.

At the completion of the computing cycle as above described, the clerk or operator will complete the transaction by opening of the cash drawer as described above in reference to FIG. 13. At this point, i.e., when the open switch 104a associated with module 12 is depressed, the CCM will complete one more complete computation of the price of goods ordered via entry switch module 12. During this computation, the CCM also reads and loads the quantities of each item purchased into the inventory module. The inventory module, which contains a plurality of registers or counters, automatically records the quantities of each item purchased. Upon the completion of this calculation, CCM 16 transfers the cash register 10 into a slow operation mode, i.e., a mode wherein the next sequence of operations is performed at the speed of the slow clock pulses from the slow clock (not shown). During the next sequence, the price of goods purchased is loaded into one of the electromechanical accumulators 34 to thereby maintain a running total of the price of all goods sold via entry switch module 12. The total quantities of goods recorded in the inventory module is retained therein, these values being additive. During this transfer of information to the electromechanical accumulators, the computational portion of the cash register 10 is "locked up." However, this procedure is again performd at a speed whereby no noticeable delay in computations at the displays 64 occurs at either of the switch entry modules 12 or 14.

Simultaneously with the transfer of price information into the electromechanical accumulator 34, the price value of the transaction is automatically printed on printer 32. The value printed on printer 32 will correspond to the price added to the accumulator of accumulator group 34.

Preferably, accumulator 34 will include one electromechanical accumulator for recording the total value of transactions on switch entry module 12, a second accumulator for the recording of the value of all transactions conducted on switch entry module 14. A third electromechanical accumulator may be used to record the value of all transactions conducted wherein no sales tax is involved.

It will be apparent that the computation of sales tax in each transaction can be negated by the manual disabling of the tax module 22 via manual control switches 110a, 110b for the entry switch modules 12 and 14, respectively. This control is again effected through the CCM 16.

OPERATION OF PRINTER CONTROL MODULE

Figure 10:
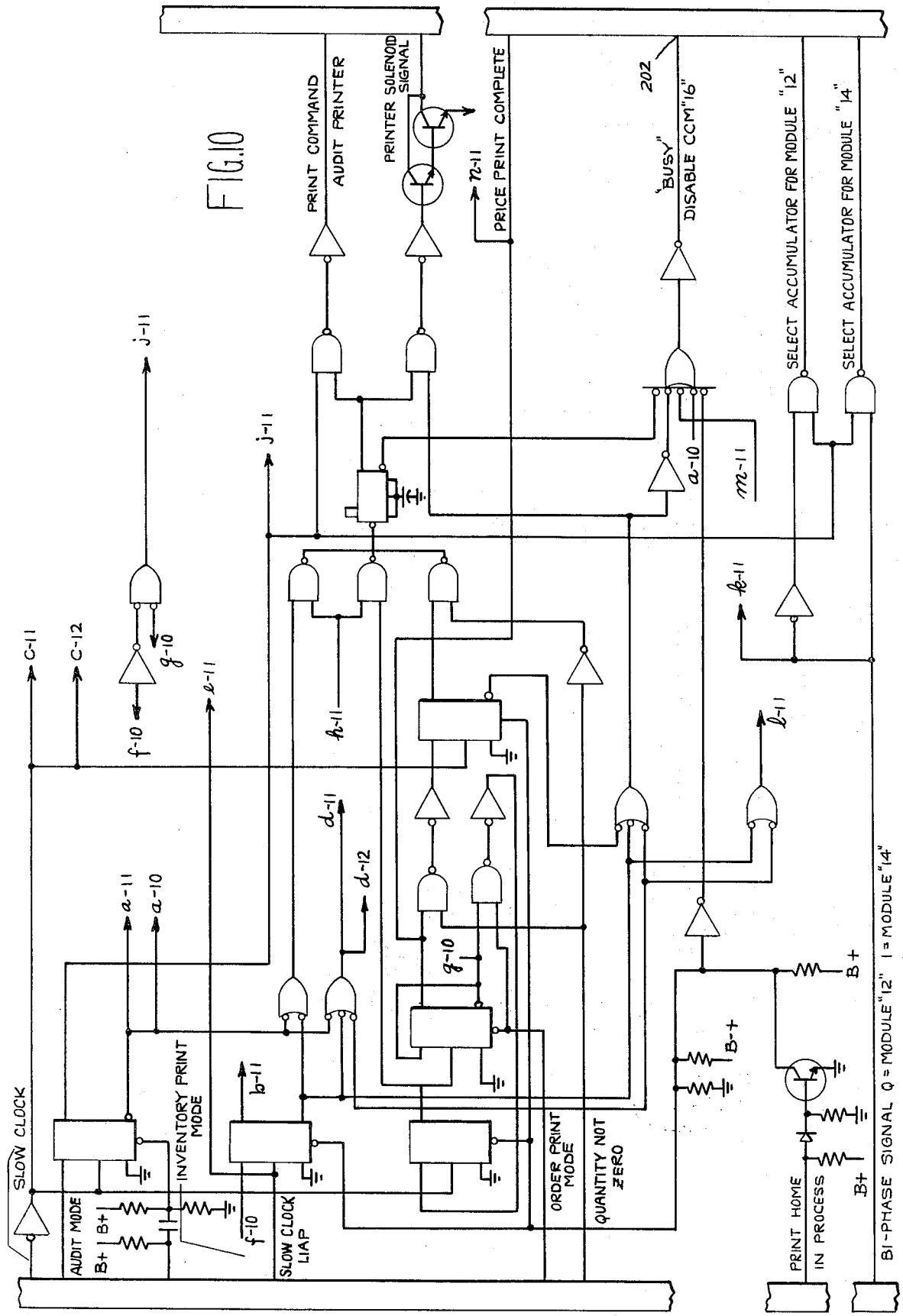
FIGS. 10 through 12 are logic diagrams of the printed control module of the present invention in accordance with MIL SPEC 806.
Figure 11:
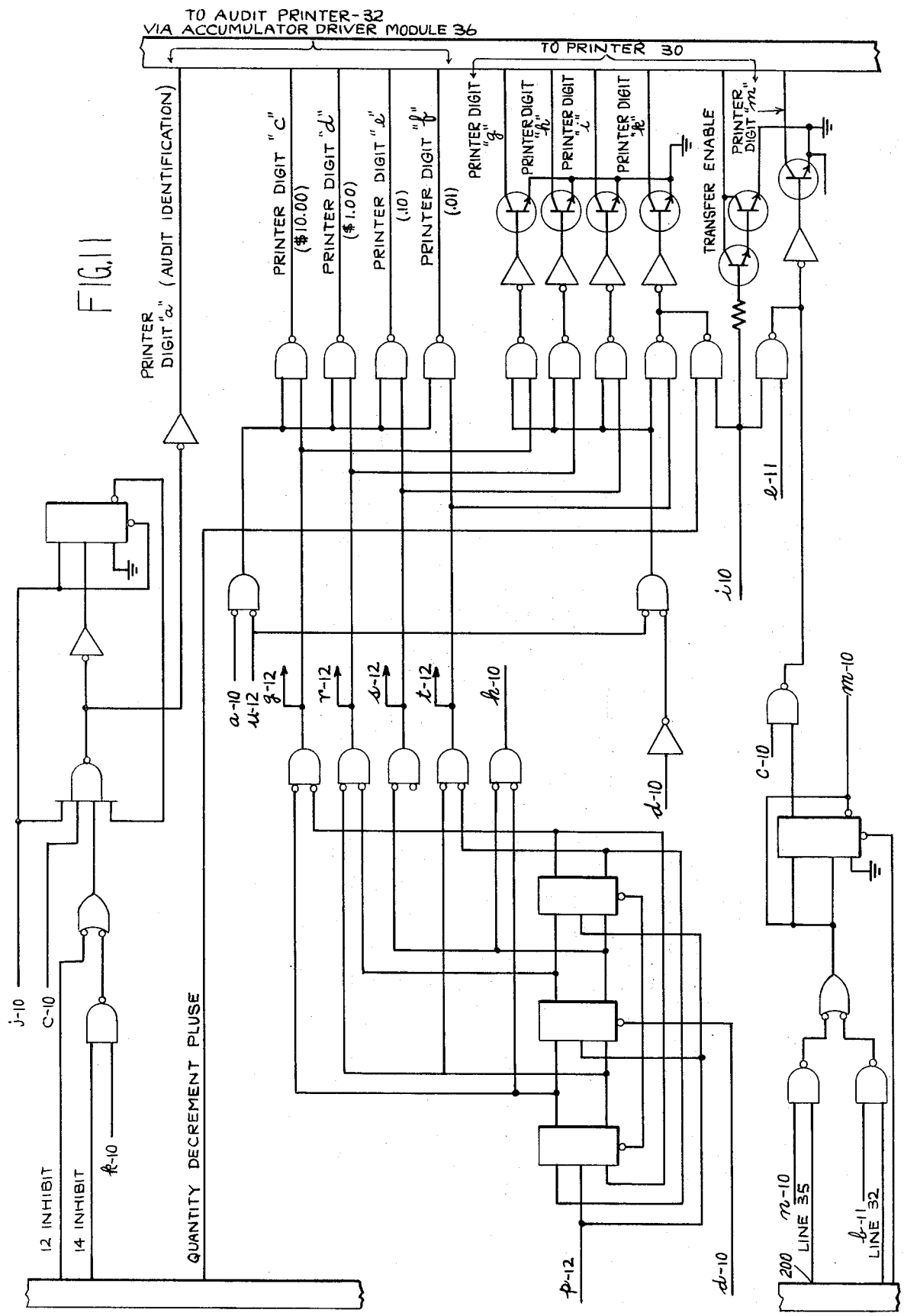
Figure 12:
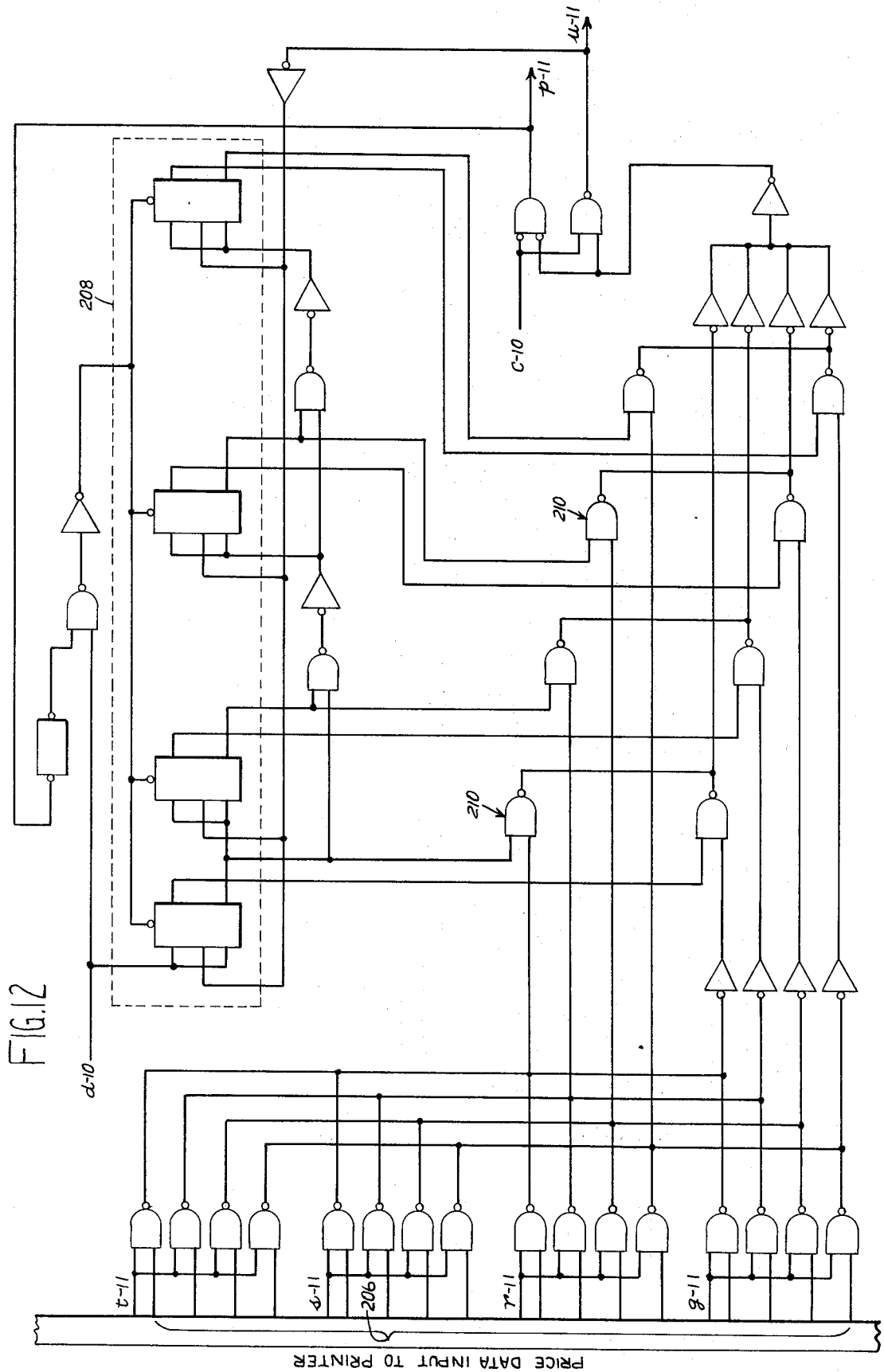

Referring now to FIGS. 10 through 12, there is illustrated, again in accordance with MIL SPEC 806, the logic diagram of the PCM 28 portion of cash register 10. PCM 28 is coupled to CCM 16 and between inventory module 26 and printers 30, 32, and accumulators 34 and provides the required sequencing and interface between the cash register 10 and the printing portions thereof.

Again, the specific details of all signal paths and signal routing is omitted for clarity and the logic diagrams are presented only for purposes of additional disclosure.

Referring now to FIGS 14, 15, and 16, there are illustrated flow diagrams setting forth the sequence of operation of the inventory control module. In overview, the cash register 10 can be operated in a normal or either of two manually selectable modes. The modes are determined by the depression of an appropriate one of manual control switches 112a, 112b, and 114, associated with switch entry modules 12 and 14, respectively, and both modules respectively. The first mode is identified as "audit mode." Audit mode is the normal operating mode of the cash register and, when operating in this mode, cash register 10 automatically loads the price of the last transaction into the respective one of electromechanical accumulators 34 associated with the switch entry module 12 or 14 and prints on a continuous paper tape the price of the goods sold in the transaction. This mode is automatic and no manual intervention is required.

The cash register 10 can also be operated in a first optional mode identified as the "order print mode." In this mode, the cash register will print on electromechanical printer 30 a list setting forth both the identity and quantity of each item involved in the transaction. This mode can be selected by the clerk using either or both of modules 12, 14 by depression of the "Grill" buttons 112a, 112b, respectively.

The second optional mode is denoted as the "inventory print mode." When operating in this mode, cash register 10 automatically prints a complete list of the quantities of each item on the menu which have been sold since the inventory was last reset. Typically, the inventory print mode will be utilized once each 24 hour period to provide a running inventory for the operators of the establishment.

Figure 8:
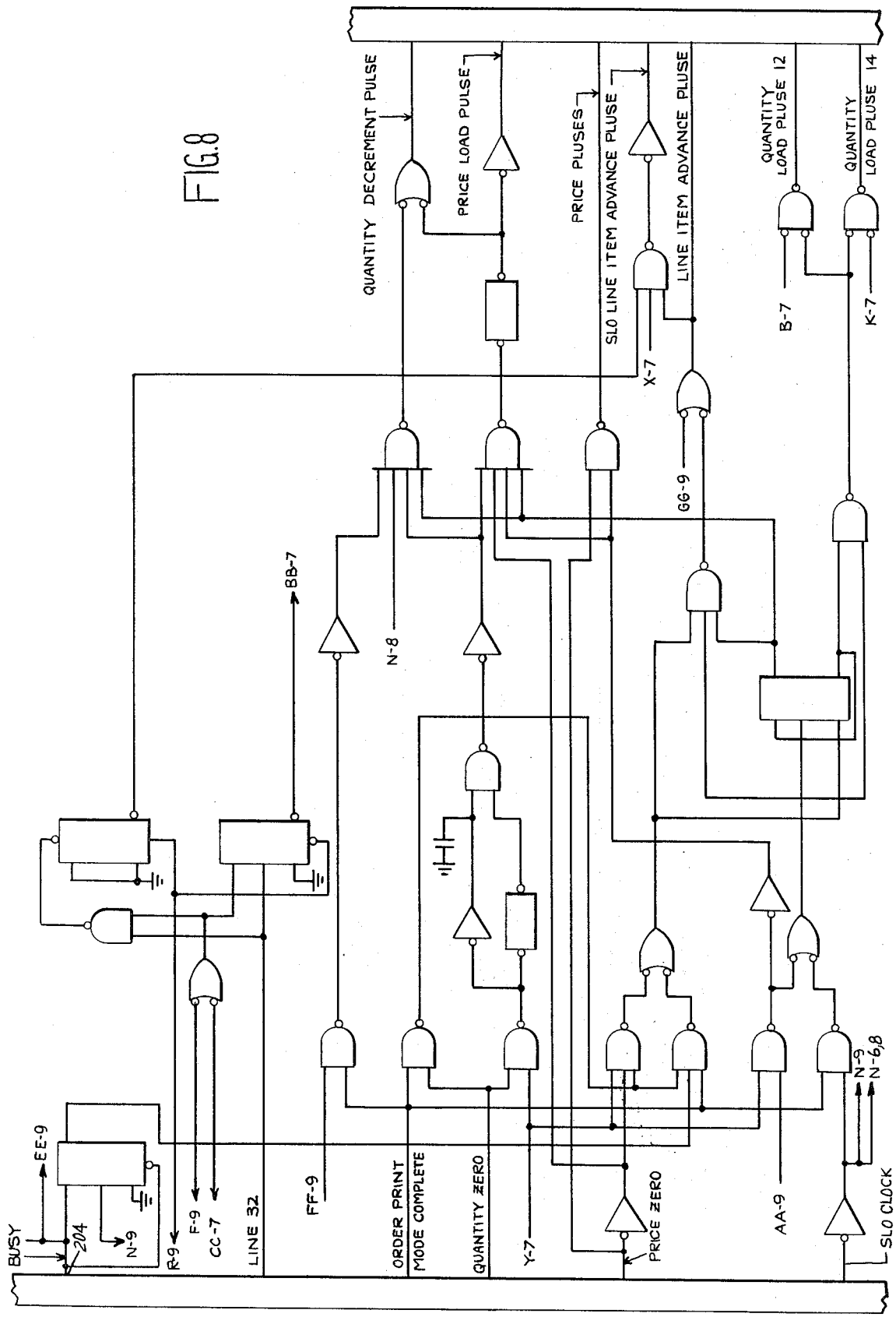

At the beginning of each complete cycle, a signal senses whether the "drawer open" button 104 has been depressed. If "yes," the cash register 10 enters the inventory compute mode. Next, the computation of price is performed in normal manner one more time. During the final computation the quantity data is stored in inventory mode 26. At the conclusion of price calculation, tax is added as above. Upon completion of tax auditing function, the control circuit (CCM 16) enters audit mode. This condition indicates a completion of the price calculating function and now the cash register is in it audit mode. In sequence, the printer control module 28 transfers the sequencing of the cash register 10 to the slow clock (not shown) and disables the CCM 16 via a "busy" signal appearing at printer control output terminal 202 and input terminal 204 of CCm 16 (FIG. 8). Next, the price data is sensed via input terminals 206 (FIG. 12). Utilizing the slow clock pulses, the four position printer counter 208 is incremented upwardly. Simultaneously, clock pulses are applied to the input of the audit printer 32 and the addressed accumulators 34. This in turn automatically increments the print wheels of printer 32 and accumulator 34 upwardly in synchronism with the upward count of counter 208. When the value in register 208 is identical to the data sensed at input terminals 206 as determined by means of comparator gates as at 210, the sensed data and the position of the print wheels of audit printer 32 and addressed accumulators 34 are known to be correlated and a print signal is applied to printer 32 whereby it prints the sensed data. Upon completion of the print cycle, a "print complete" signal is generated which automatically returns the cash register 10 to its normal compute mode under control of CCM 16.

If an order print mode switch 112a or 112b has been depressed, upon completion of the normal price computation, cash register 10 transfers into the order print mode. Referring now to FIG. 15, the first step in this sequence is to transfer control of the cash register 10 from the fast clock to the slow clock (not shown). When the printer control module 28 has been synchronized with the slow clock (not shown), the CCM 16 and PCM 28 are alternately operated as controlled by a "Busy" signal. Next, price data is sensed as described above in reference to the audit print mode operation. When the data in the PCM 28 compares with the sensed data the price data is printed on electromechanical printer 30, again, this printing operation being the same as the printing operation described above in reference to the normal audit print cycle, but on printer 30 rather than printer 32.

When the print is complete a print complete signal is generated within the printer 30 and the PCM 28 is caused to enter the order print mode cycle. At this point in operation, CCM 16 is again activated in response to the absence of the "Busy" signal. Following its normal sequence, CCM 16 first interrogates the first line item switch 42 of the appropriate switch entry module 12 or 14. Next, CCM 16 determines whether the switch is in its zero position. If it is in a zero position, another LIAP is generated and the next item switch is interrogated. If the quantity is not zero, the quantity data in counter module 18 is decremented to zero and, simultaneously, printer 30 is incremented upwardly an equal number of digits. At this point, a print instruction is applied to printer 30. Since the printer was incremented in synchronism with decrementing the quantity counter of module 18, the printer will be in proper position to print the quantity of the item ordered. Following the print cycle, the line item counter is tested to determine whether the item printed was the last line item. If it is not, another LIAP is generated and the above sequence is repeated. When the last line item has been printed, the test of "last line item?" will be "yes" and control is returned to compute mode. It will be observed that the printed tape from printer 30 provides a permanent record of the transaction. The record can be used either to fill the order or as a printed receipt.

Referring now to FIG. 16 there is illustrated the flow or sequence of operation when the cash register is manually placed in the inventory print mode via switch 114.

Control is transferred to operation under the slow clock (not shown). Next, quantity data which has been continuously loaded into the inventory module 26 is sensed. It will be recalled that the inventory module has recorded therein the quantities of each item sold at the conclusion of each transaction. The quantity data corresponding to the first line item is loaded into the printer counter 208. The counter value is tested for zero. If the accumulator does not contain a zero quantity, the counter 208 is incremented by one digit and the printer 30 is incremented by one digit. This continues until the accumulator has been incremented to have the value therein corresponding to the sensed quantity recorded in inventory module 26. This quantity is then printed in response to a print signal from PCM 28.

Another LIAP is generated and the next quantity register in the inventory module 26 is sensed and the data printed as above. When the last line item quantity has been printed, control is returned to compute mode and operation continues the normal sequence under control of the fast clock.

DICTIONARY

The following dictionary of terms sets forth the names and a brief description of the function of significant signals of the cash register 10, these signals also appearing at the appropriate terminals in the drawings.

COMPUTE MODE or INVENTORY COMPUTE MODE - a level signal defining the period in which computation is in process.

INVENTORY COMPUTE MODE - a level signal defining the period in which the cash register 10 is in inventory compute mode only.

LINE 36 - a level signal switch occurs at the completion of the interrogation of item switches or the inventory quantities in the inventory module.

AUDIT MODE - a level signal defining the period in which the audit mode of operation is in process.

COUNTER RESET - a pulse utilized to reset the inventory counter in inventory module.

PARTIAL COMPUTATION COMPLETE - a pulse defining the completion of computation exclusive of the tax.

TRANSFER PULSE - a pulse defining the conclusion of price plus tax computation.

SUM RESET - a pulse defining the completion of all computation, permitting the start of the next computation.

BUSY - a level signal defining the period when the printer is active (used only in audit mode, inventory print mode, or order print mode).

LINE 32 - a level signal defining the period when the scan is at line 32 (the signal is used in inventory compute mode and inventory print mode only).

QUANTITY ZERO - a pulse which defines the zero status of the quantity counter.

PRICE ZERO - a pulse indicating the zero status of the price counter.

QUANTITY DECREMENT PULSE - these are pulses which can decrement the quantity counter downward to zero.

SLOW LINE ITEM ADVANCE - these are pulses which are utilized to advance the line item counter when the cash register 10 is operating in inventory compute mode or inventory print mode.

LINE ITEM ADVANCE PULSE - these are pulses which can increment the line item counter in the compute mode.

PRICE LOAD PULSE - these are pulses which are used to load the price of each line item from the line item price switches to the price counter.

PRICE DECREMENT PULSE - these are pulses which are used to count the price counter downward to zero.

PHASE 12, PHASE 14 - these are phasing signals which couple either module 12 or module 14 to the CCM 16.

QUANTITY LOAD PULSE 12 OR 14 - these are interrogation pulses which are used to interrogate the line item switches and load the quantity counter from modules 12 and 14.

INVENTORY PRINTOUT - this is a level signal defining the period in which inventory is being printed, typically, 15 seconds in duration.

MASTER FAST CLOCK - this is the fast clock signal used in all computations, the frequency of the fast clock signal is about 150 K Hz.

MASTER SLOW CLOCK - this is the slow clock signal which is used in computation and printing operations of the cash register 10. The frequency of this clock signal is about 32 Hz.

RESET LEVER 12, 14 - these are signals derived from the reset lever 60 indicating operation thereof.

OPEN CASH DRAWER 12, 14 - these are signals indicating that the cash drawers associated with modules 12 and 14 have been opened or closed.

CASH DRAWER ENABLE - these are signals used to automatically open the cash drawer at the proper point in the computation process.

GRILL REQUEST - This is a signal generated in response to depression of the order print mode switch 112a, 112b to initiate the printing of an order.

NO TAX 12, 14 - these are signals which are generated in response to the depression of the no tax buttons 110a, 110b of modules 12, 14 to inhibit the computation of sales tax on an order.

NO TAX LIGHT - these are signals which illuminate the no tax indicator light (not shown) when a "no tax" computation is being performed.

DISABLE 12, 12 and 14, and 14 - these are signals responsive to a key switch (not shown) for selectively disabling switch entry module 12, switch entry module 12 and 14, or entry switch module 14, the signal being used when it is desired not to use one, the other, or both of the switch entry modules 12 and 14, respectively.

INHIBIT MODULE 12, 14 - these are signals which effect the disabling of the respective entry switch modules.

MANUAL RESTART - this is a manual intervention button (not shown) for restarting the cash register if required.

INVENTORY STORAGE MODE - this is a level signal which effects the storage of quantity data into the inventory module 26.

PRINT HOLD IN PROCESS - this is a signal which inhibits computations while the printer is in operation.

SELECT ACCUMULATOR - these are signals for directing price data to selected ones of accumulators 34.

PRINTER DIGIT a, c, d, e, f - these are the drive signals applied to printer 32.

PRINTER DIGIT g, h, j, k, m - these are drive signals applied to printer 30.

PRINTED PRICE DATA INPUT - these are the 5 price data signals which are derived from price accumulator 20 and applied to counter 208.

From the above description, it will be seen that the present invention provides a direct-entry cash register which enables the entry of selected quantities of ordered goods by means of a single switch manipulation. This substantially reduces the time and skill required of the operator. The switch entry panels, by reason of the first and second indicia associated therewith, provide a temporary but visible record of each order until same has been filled and the transaction completed thereby obviating the need for written or marked order slips.

The price data for goods sold can be simply and easily adjusted in accordance with price changes by manual programming via price switches 19. Because all computations are performed internally within the cash register, no arithmetic need be performed by the clerk thereby substantially reducing errors.

The cash register computes sales tax or other applicable taxes automatically thereby simplifying the computations that must be performed by the clerk. The cash register provides a continuous indication of the order as it is taken to thereby enable the customer to view the cost of the purchase at all points in the order.

By reason of the unique phasing or multiplexing of the switch entry modules, the cash register provides complete operational facilities for at least two operating stations without the need for additional electronic circuitry, printers, or the like. The cash register, by reason of its electromechanical accumulators and printers provides complete records of sales, and inventories, and will provide printed order slips which can be used in lieu of the switch entry modules for filling an order when the order cannot be immediately filled. The sequence of operations shown in FIG. 13 prevents improper operation by preventing a subsequent sequence until all portions of the cash register 10 have been properly operated.

While there have been described above the principles of this invention in connection with specific apparatus, it is to be clearly understood that this description is made only by way of example and not as a limitation to the scope of the invention.

What is claimed is:

1. In a direct-entry cash register for totaling the cost of a selected quantity of selected ones of a predetermined plurality of items offered for sale, the combination comprising:
    a. switch means for selecting a quantity of each one of a predetermined plurality of items, said switch means including a plurality of items switches, there being one of said item switches for each item offered for sale, each said switch being selectively operable between a plurality of discrete positions, each said position corresponding to a different selected quantity of the corresponding item,
    b. first indicia means associated with each said item switch for identifying the item corresponding thereto,
    c. second indicia means operatively coupled to each said item switch for automatically and visibly indicating the selected quantity of each of said items,
    d. means for programming the price of each said offered item, said programming means including a plurality of groups of manually settable switches, each said group being operable between a multiplicity of discrete positions corresponding to a multiplicity of prices, there being one group of said switches for each of said items offered for sale,
    e. computing means for automatically interrogating said switch means and said programming means to thereby determine the price and quantity of items ordered and totaling the quantity and price of all said selected items, and
    f. means for visibly displaying said total price.

2. The combination of claim 1 wherein each said item switch includes means for generating a binary coded output signal in response to interrogation thereof by said computing means.

3. The combination of claim 2 wherein said second indicia means includes an indicator device operatively coupled to each said item switch, said indicator device having thereon decimal indicia corresponding to each of said positions of said switch, one of said decimal indicia of each said switch being visible at one time.

4. The combination of claim 3 wherein said computing means includes means for generating a plurality of sequentially occurring item switch interrogation signals, said item switches each including an input terminal coupled to said computing means to receive predetermined ones of said interrogation signals and a common output circuit, said binary coded signal appearing at said output circuit in response to the occurrence of said interrogation signals.

5. The combination of claim 4 wherein said output circuit includes a decimal to binary coded converter, said converter having a plurality of input terminals, there being one said input terminal for each position of said item switches.

6. The combination of claim 5 wherein each of said groups of price switches includes means for generating a binary coded output signal in response to interrogation thereof by said computing means.

7. The combination of claim 6 wherein said computing means includes means for generating a price switch interrogation signal for interrogating the said group of price switches corresponding to each respective one of said item switches a number of times corresponding to the position thereof.

8. The combination of claim 7 wherein said binary coded signal means includes a second decimal to binary coded converter, said second converter having a plurality of input terminals, there being one said input terminal for each position of said price switches.

9. The combination of claim 1 wherein said computing means includes a price accumulator and sequencing control means coupled between said switch and said programming means and said price accumulator for controlling the interrogation of said switch and programming means and the storage and manipulation of the data determined thereby, said price display means being coupled to said accumulator and responsive to the value stored therein for generating a decimal display having a value equal to the value in said price accumulator.

10. The combination of claim 9 wherein said price accumulator includes a plurality of binary stages, said cash register further including a tax computing means operatively coupled to said price accumulator and responsive to the value therein for generating an electrical signal corresponding to the sales tax applicable to the price of goods sold in a transaction.

11. The combination of claim 10 wherein said tax computing means includes a fixed program circuit and a tax counter, said fixed program circuit including a plurality of coincidence gates, each of said coincidence gates having an input terminal coupled to said price accumulator to receive a predetermined one of the bits stored in said price accumulator stages, said coincidence gates having a common output terminal and being logically coupled together to generate a tax pulse whenever the value in said price accumulator is equal to each of a predetermined plurality of values.

12. The combination of claim 11 wherein said plurality of values correspond to the sales tax addition points specified in the tax structure in effect in the place of use of said cash register.

13. The combination of claim 1 wherein said item switches are disposed in a flat array, said display means, and said first and second indicia facing in a common direction.

14. The combination of claim 1 wherein there are at least two sets of said item switches, there being one of said display means associated with each of said sets of switches, said computing means further including means for automatically and individually interrogating each of said sets of item switches.

15. The combination of claim 14 wherein there are two of said sets of switches, and said means for interrogating said sets of switches includes a bi-phase switch, coupled between said computing means and said sets of item switches.

16. The combination of claim 15 wherein said computing means and said bi-phase switch operate at a speed greater than the resolution speed of a human eye whereby the operation of said computing means in association with each of said sets of switches appears to be continuous.

17. The combination of claim 15 wherein said computing means includes an automatic sequencing means for controlling the sequence of operation of said cash register, a line item address counter, a quantity counter, and a price counter, said sequencing means including means for individually and sequentially addressing individual ones of said item switches to thereby couple same to said quantity counter, means for generating an item switch interrogation pulse to load the quantity determined by the position of said addressed item switch into said quantity counter, means for coupling that one of said groups of price switches associated with said addressed item switch to said price counter, means for repetitively generating a price switch interrogating pulse for interrogating said last mentioned group of price switches a number of times equal to the quantity loaded into said quantity counter to thereby load price data into said price counter, and means for loading the price data loaded into said price counter into said price accumulator.

18. The combination of claim 17 wherein each of said display means includes a storage register coupled to said computing means and said bi-phase switch, said storage means being responsive to the value in said accumulator for generating a "segment" coded signal, said display means each including a plurality of alpha-numeric display elements, said alpha-numeric display elements being coupled simultaneously storage means, predetermined portions of said display elements being rendered luminescent in response to said "segment" coded signal to generate a visible decimal display corresponding to the value in said accumulator.

19. The combination of claim 18 further including first manual switch means for generating a signal indicative that a transaction has been fully entered on one of said sets of item switches, said computing means being responsive to said last mentioned signal to compute the price of said transaction, add the sales tax thereto and to operate continuously in conjunction with the other of said sets of item switches until said one of said sets of item switches has been reset.

20. The combination of claim 19 wherein each said set of item switches includes means for manually and simultneously resetting all of the item switches of each of said sets of switches to their zero positions to thereby condition said computing means for another transaction therewith.

21. The combination of claim 20 further including a second accumulator, a printer control module coupled between said price accumulator and said second accumulator, said printer control module generating a plurality of sequentially occurring pulse signals in response to the value in said price accumulator and actuation of said manual switch means, said second accumulator being responsive to said pulses and operation of said first manual switch means to add to the value stored therein a value corresponding to the last price computed for said transaction.

22. The combination of claim 20 wherein there is one of said second accumulators for each set of entry switches, said printer control module being responsive to said bi-phase control and said computing means for coupling a predetermined one of said second accumulators to said computing means in synchronism with coupling a predetermined one of said sets of item switches to said computing means whereby the accumulated value in each of said second accumulators corresponds to the total price of transactions entered on a predetermined one of said sets of switches.

23. The combination of claim 21 further including means for manually disabling said tax computing means, and a "no tax" accumulator, said printing control means including means for adding to the value of said "no tax" accumulator the total prices of all transactions completed when said tax module has been disabled.

24. The combination of claim 20 further including an order printer coupled to said printing control module, said printer being responsive to said sequentially occurring pulses to register and print the price of each transaction.

25. The combination of claim 24 further including means responsive to said bi-phase switch for producing a printed indicia adjacent each said price for identifying that one of said sets of price switches utilized in entering each said order.

26. The combination of claim 25 further comprising a second printer coupled to said printing control module and second manual switch means coupled to said sequencing means and said printer control module for manually altering the control sequence thereof, said second printer being responsive to operation of said second manual switch means and said sequential pulses to print a list of items entered on the said item entry switches and the total price of said items.

27. The combination of claim 26 wherein said computing means further includes an inventory counter, said inventory counter including a plurality of inventory quantity counters, said computing means including means for loading into individual ones of said quantity counters the quantities of items entered in each transaction at the completion thereof, said cash register further including third manual switch means for manually altering the control sequence of said sequencing means and said printer control module, said second printer being responsive to actuation of said third manual switch means, said sequencing means, and said printer control module to print a list of the quantities stored in said inventory counter.

28. The combination of claim 1 further including a cash drawer operatively coupled to said computing means, a drawer switch operative between open and closed positions for indicating that said drawer is opened and closed, respectively, said computing means being rendered static when said drawer switch is open, a reset switch operatively coupled to said reset means, said reset switch being rendered operative in response to opening said cash drawer, said computing means being rendered static in response to operation of said reset switch when the latter has been rendered operative, said drawer switch and said reset switch being rendered inoperative in response to closure of said drawer and manual manipulation of said reset means.

29. The combination of claim 1 wherein there are two sets of said item switches and a cash drawer associated with each said set of item switches, each of said cash drawers being operatively associated with a predetermined one of said sets of item switches, respectively, said computing means including means responsive to opening of said drawer for locking said computing means to that one of said sets of item switches associated with the other of said drawers for continuous operation therewith, and reset means for disabling said locking means when said opened drawer has been closed.

30. In a direct-entry cash register for totaling the cost of a selected quantity of selected ones of a predetermined plurality of items offered for sale, the combination comprising:
   a. switch means for selecting a quantity of each one of a predetermined plurality of items, said switch means including a plurality of item switches, there being one of said item switches for each item offered for sale, each said switch being selectively operable between a plurality of discrete positions, each said position corresponding to a different selected quantity of the corresponding items,
   b. first indicia means associated with each item switch for identifying the item corresponding thereto,
   c. second indicia means operatively coupled to each said item switch for automatically and visibly indicating the selected quantity of each of said items,
   d. means for alterably programming into said cash register the price of each said offered item,
   e. computing means for automatically and continuously interrogating said switch means and said programming means to thereby continuously determine the quantity and price of all said selected items ordered as they are entered and the total price thereof, and
   f. means for visibly displaying said total price.

31. The combination of claim 30 wherein each said item switch includes means for generating a binary coded output signal in response to interrogation thereof by said computing means.

32. The combination of claim 31 wherein said second indicia means includes a plurality of indicator devices individually and operatively coupled to each of said item switches, said indicator devices having thereon a decimal indicia corresponding to each position of the corresponding switch, one of said decimal indicia of each said switch being visible at one time.

33. The combination of claim 32 wherein said computing means includes means for repetitively generating a plurality of sequentially occurring item switch interrogation signals, each said item switch including an input terminal, all of said item switches having a common output circuit, said input terminals being individually coupled to said computing means to receive predetermined ones of said interrogation signals, said binary coded signal appearing at said output circuit in response to the occurrence of individual ones of said interrogation signals.

34. The combination of claim 33 wherein said output circuit includes a decimal to binary coded converter, said converter having a plurality of input terminals, there being one said input terminal for each position of said item switches.

35. The combination of claim 34 wherein said programming means includes a plurality of groups of manually settable switches, each said group of switches being operable between a multiplicity of discrete positions, each combination of said positions corresponding to a different price of the corresponding item, there being one group of said switches for each of said items offered for sale.

36. The combination of claim 30 wherein one of said positions of each of said item switches corresponds to a quantity of zero, and further including means for manually and simultaneously resetting all of said item switches to their zero position.

37. The combination of claim 36 wherein said computing means includes a price accumulator and a sequencing control means coupled between said item switch means and said programming means and said price accumulator for controlling the interrogation of said switch and programming means and manipulating and storing the data determined thereby in said price accumulator, said price display means being coupled to said accumulator and being responsive to the value stored therein for generating a decimal display having a value equal to the value in said price accumulator, said price accumulator including a plurality of binary stages, said cash register further including a tax computing means operatively coupled to said price accumulator and said computing means and responsive to value in said price accumulator and a signal from said computing means for generating an electrical signal corresponding to the sales tax applicable to the price of goods sold in a transaction.

38. The combination of claim 37 wherein said tax computing means includes a fixed program circuit and a tax counter, said fixed program circuit including a plurality of coincidence gates, each of said coincidence gates having an input terminal coupled to predetermined ones of said binary stages, said coincidence gates having a common output terminal and being logically coupled together to generate a tax pulse whenever the value in said price accumulator is equal to each of a predetermined plurality of values.

39. The combination of claim 38 wherein said computing means includes an automatic sequencing means for controlling the sequence of operation of said cash register, a line item address counter, a quantity counter, and a price counter, said sequencing means including means for individually and sequentially addressing individual ones of said item switches to thereby couple same to said quantity counter, means for generating an item switch interrogation pulse to load the quantity determined by the position of the addressed item switch into said quantity counter, means for interrogating said programming means to determine the price of the corresponding item and for loading said price into said price counter a number of times equal to the quantity loaded into said quantity counter, and means for loading the price data loaded into said price counter into said price accumulator.

40. The combination of claim 38 further including a second manual switch means for generating a signal indicative that a transaction has been completed, a second accumulator, and a printer control module coupled between said price accumulator and said second accumulator including second display means for displaying the value stored therein, said printer control module generating a plurality of sequentially occurring pulses corresponding to the value stored in said price accumulator and in response to actuation of said manual switch means, said second accumulator being responsive to said pulses to add to the value stored therein a value corresponding to the price computed for said transaction.

41. The combination of claim 40 further including an order printer coupled to said printing control module, said order printer being responsive to said sequentially occurring pulses to register and print the price of each transaction.

42. The combination of claim 41 further including second manual switch means coupled to said sequencing means and said printer control module for manually altering the control sequence thereof, said order printer being responsive to the operation of said second manual switch means and said sequential pulses to print a list of items entered on said item entry switches and the total price of said transaction.

43. The combination of claim 42 wherein said computing means further includes an inventory module, said inventory module including a plurality of inventory quantity counters, said computing means including means for loading into individual ones of said inventory quantity counters the quantities of items entered in each transaction at the completion thereof, said cash register further including third manual switch means for manually altering the control sequence of said computing means and said printer control means, said order printer being responsive to actuation of said third manual switch means, said computing means, and said printer control means to print a list of the quantities stored in said inventory quantity counters.

* * * * *